United States Patent
Kim et al.

(10) Patent No.: US 7,215,656 B1
(45) Date of Patent: May 8, 2007

(54) TRANSMISSION AND RECEIVING USING SPREADING MODULATION FOR SPREAD SPECTRUM COMMUNICATIONS AND THEREOF APPARATUS

(75) Inventors: Jong Myeong Kim, Kyung Nam (KR); Su Won Park, Taejon (KR); Dan Keun Sung, Taejon (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 883 days.

(21) Appl. No.: 09/890,249

(22) PCT Filed: Nov. 30, 2000

(86) PCT No.: PCT/KR00/01385

§ 371 (c)(1),
(2), (4) Date: Aug. 3, 2001

(87) PCT Pub. No.: WO01/41318

PCT Pub. Date: Jun. 7, 2001

(30) Foreign Application Priority Data

Dec. 4, 1999 (KR) .............................. 1999-54963

(51) Int. Cl.
*H04J 3/00* (2006.01)
(52) U.S. Cl. ..................................................... 370/336
(58) Field of Classification Search ................ 370/336, 370/317, 335, 342, 328, 508, 519, 503, 324, 370/320, 332, 206–210, 280; 375/146, 130, 375/295, 296, 346, 141–144, 285, 219, 150, 375/148, 149, 325, 371; 455/434; 348/663, 348/668, 659, 665, 667
See application file for complete search history.

(56) References Cited

U.S. PATENT DOCUMENTS

| | | | | |
|---|---|---|---|---|
| 5,103,459 A | * | 4/1992 | Gilhousen et al. | 370/206 |
| 5,235,612 A | * | 8/1993 | Stilwell et al. | 375/144 |
| 5,325,394 A | * | 6/1994 | Bruckert | 375/148 |
| 5,687,169 A | * | 11/1997 | Fullerton | 370/324 |
| 6,233,231 B1 | * | 5/2001 | Felix et al. | 370/335 |
| 6,359,868 B1 | * | 3/2002 | Chen et al. | 370/335 |
| 6,400,755 B1 | * | 6/2002 | Harris et al. | 375/146 |
| 6,618,429 B2 | * | 9/2003 | Gilhousen et al. | 375/141 |
| 6,801,516 B1 | * | 10/2004 | Lomp et al. | 370/342 |

* cited by examiner

*Primary Examiner*—Chi Pham
*Assistant Examiner*—Prenell Jones
(74) *Attorney, Agent, or Firm*—Bacon & Thomas, PLLC

(57) ABSTRACT

The present invention is related to a method and an apparatus for the orthogonal complex-domain spreading modulation in CDMA spread spectrum communication system when there are channels with statistically higher transmitting power. In CDMA spread spectrum communication systems with a transmitter and a receiver, the transmitter according to the invention has several channels with different information. Two channels with higher power than the others, which are spread in the conventional scheme, are spread with the orthogonal codes using a complex-domain multiplier. The spread signals are added. Then the signals are scrambled using a complex-domain multiplier with secondary scrambling sequences generated by a special scrambling code generator with primary scrambling sequences as inputs. The receiver does reverse operation of the transmitter.

7 Claims, 21 Drawing Sheets

0

$+\pi/2$ $\pi$ $-\pi/2$

TRANSMISSION AND RECEIVING USING SPREADING MODULATION FOR SPREAD SPECTRUM COMMUNICATIONS AND THEREOF APPARATUS

TECHNICAL FIELD

This invention is concerned with spreading modulation methods for orthogonal multiple channel transmitters in CDMA (code division multiple access) communication systems. More particularly it is related to orthogonal complex-domain spreading modulation methods for CDMA communication systems when there are channels with statistically higher transmitting power.

BACKGROUND ART

In description of the prior art, the same reference number is used for a component having the same function as that of the present invention. FIG. 1 shows a schematic diagram for a conventional CDMA transmitter with orthogonal multiple channels. The transmitter in FIG. 1 is based on the cdma2000 system, which is one of the candidates for IMT-2000 (International Mobile Telecommunications-2000) system as a third generation mobile communication systems. The transmitter has 5 orthogonal channels: A Pilot CHannel (PiCH) used for coherent demodulation; a Dedicated Control CHannel (DCCH) for transmitting control information; a Fundamental CHannel (FCH) for transmitting low speed data such as voice; and two Supplementary CHannels (SCH; SCH1, SCH2) for high-speed data services. Each channel passes through a channel encoder and/or an interleaver (not shown in FIG. 1) according to the required quality of the channel.

Each channel performs the signal conversion process by changing a binary data $\{0, 1\}$ into $\{+1, -1\}$. Even though it is explained with the changed $\{+1, -1\}$, our method can be equally applied to the information represented by several bits, for example, $\{00, 01, 11, 10\}$ is changed into $\{+3, +1, -1, -3\}$. The gain for each channel is controlled based on the required quality and transmitting data rate by using the gain controllers $G_P(\mathbf{110})$, $G_D(\mathbf{112})$, $G_{S2}(\mathbf{114})$, $G_{S1}(\mathbf{116})$, and $G_F(\mathbf{118})$. The gain for each channel is determined by a specific reference gain, and the amplifiers (170, 172) control the overall gain. For example, with $G_P=1$, other gain $G_D$, $G_{S2}$, $G_{S1}$, or $G_F$ can be controlled. Gain controlled signal for each channel is spread at the spreader (120, 122, 124, 126, 128) with orthogonal Hadamard code $W_{PiCH}[n]$, $W_{DCCH}[n]$, $W_{SCH2}[n]$, $W_{SCH1}[n]$, or $W_{FCH}[n]$, and is delivered to the adder (130, 132).

Hadamard matrix, $H_{(p)}$, comprising the orthogonal Hadamard codes has the following four properties:

(1) The orthogonality is guaranteed between the columns and the rows of an Hadamard matrix. When $$H_{p\times p} = \begin{bmatrix} h_{0,0} & h_{0,1} & \cdots & h_{0,p-1} \\ h_{1,0} & h_{1,1} & \cdots & h_{1,p-1} \\ \vdots & \vdots & \ddots & \vdots \\ h_{p-1,0} & h_{p-1,1} & \cdots & h_{p-1,p-1} \end{bmatrix}$$

$$H^{(p)} = \begin{bmatrix} \overline{h_0} \\ \overline{h_1} \\ \vdots \\ \overline{h_{p-1}} \end{bmatrix} = [\overline{h_0}^T \ \overline{h_1}^T \cdots \overline{h_{p-1}}^T]$$

[EQUATION 1]

and, $h_{i,j} \in \{+1, -1\}$; $i,j \in \{0, 1, 2, \ldots, p-1\}$ matrix $H^{(p)}$ is a p×p Hadamard matrix if the following equations hold.

$$H_{p\times p} H^T_{p\times p} = pI^{(p)}$$ [EQUATION 2]

$$\overline{h_i}\overline{h_j} = p \cdot \delta_{i,j}$$

Where $I^{(p)}$ is a p×p identity matrix, and $\delta_{i,j}$ is the Kronecker Delta symbol, which becomes 1 of i=j, and 0 for i≠j.

(2) It is still an Hadamard matrix $H^{(p)}$ even if the order of the columns and the rows of an Hadamard matrix is changed.

(3) The order of Hadamard matrix $H^{(p)}$, p, is 1, 2, or a multiple number of 4. In other words, $p-\{1,2\} \cup \{4n | n \in Z^+\}$, where $Z^+$ is a set of integers which are greater than 0.

(4) The mn×mn matrix $H^{(mn)}$ produced by the Kronecker product (as in EQUATION 3) from a m×m Hadamard matrix $A^{(m)}$ and a n×n Hadamard matrix $B^{(n)}$ is also an Hadamard matrix.

$$H_{mn \times mn} = A_{m \times m} \otimes B_{n \times n}$$ [EQUATION 3]

$$= \begin{bmatrix} a_{0,0} & a_{0,1} & \cdots & a_{0,m-1} \\ a_{1,0} & a_{1,1} & \cdots & a_{1,m-1} \\ \vdots & \vdots & \ddots & \vdots \\ a_{m-1,0} & a_{m-1,1} & \cdots & a_{m-1,m-1} \end{bmatrix} \otimes \begin{bmatrix} b_{0,0} & b_{0,1} & \cdots & b_{0,n-1} \\ b_{1,0} & b_{1,1} & \cdots & b_{1,n-1} \\ \vdots & \vdots & \ddots & \vdots \\ b_{n-1,0} & b_{n-1,1} & \cdots & b_{n-1,n-1} \end{bmatrix}$$

$$= \begin{bmatrix} b_{0,0}A & b_{0,1}A & \cdots & b_{0,n-1}A \\ b_{1,0}A & b_{1,1}A & \cdots & b_{1,n-1}A \\ \vdots & \vdots & \ddots & \vdots \\ b_{n-1,0}A & b_{n-1,1}A & \cdots & b_{n-1,n-1}A \end{bmatrix} = \begin{bmatrix} h_{0,0} & h_{0,1} & \cdots & h_{0,mn-1} \\ h_{1,0} & h_{1,1} & \cdots & h_{1,mn-1} \\ \vdots & \vdots & \ddots & \vdots \\ h_{mn-1,0} & h_{mn-1,1} & \cdots & h_{mn-1,mn-1} \end{bmatrix}$$

The present invention describes CDMA systems using the column vectors or row vectors of a $2^n \times 2^n$ Hadamard matrix $H^{(2^n)}$ as orthogonal codes, where the $2^n \times 2^n$ Hadamard matrix $H^{(2^n)}$ is generated from a $2 \times 2$ Hadamard matrix as shown in EQUATION 4 (n=1, 2, 3, ..., 8). In particular, the set of the column vectors or the row vectors of the produced Hadamard matrix is $2^n$ dimensional Walsh codes.

$$H^{(2)} = H_{2 \times 2} = \begin{bmatrix} +1 & +1 \\ +1 & -1 \end{bmatrix} = \begin{bmatrix} W_0^{(2)} \\ W_1^{(2)} \end{bmatrix} \quad \text{[EQUATION 4]}$$

$$H^{(4)} = H_{4 \times 4} = H_{2 \times 2} \otimes H_{2 \times 2} =$$

$$\begin{bmatrix} +1 & +1 & +1 & +1 \\ +1 & -1 & +1 & -1 \\ +1 & +1 & -1 & -1 \\ +1 & -1 & -1 & +1 \end{bmatrix} = \begin{bmatrix} W_0^{(4)} \\ W_1^{(4)} \\ W_2^{(4)} \\ W_3^{(4)} \end{bmatrix}$$

$$H^{(8)} = H_{8 \times 8} = H_{2 \times 2} \otimes H_{4 \times 4} =$$

$$\begin{bmatrix} +1 & +1 & +1 & +1 & +1 & +1 & +1 & +1 \\ +1 & -1 & +1 & -1 & +1 & -1 & +1 & -1 \\ +1 & +1 & -1 & -1 & +1 & +1 & -1 & -1 \\ +1 & -1 & -1 & +1 & +1 & -1 & -1 & +1 \\ +1 & +1 & +1 & +1 & -1 & -1 & -1 & -1 \\ +1 & -1 & +1 & -1 & -1 & +1 & -1 & +1 \\ +1 & +1 & -1 & -1 & -1 & -1 & +1 & +1 \\ +1 & -1 & -1 & +1 & -1 & +1 & +1 & -1 \end{bmatrix} = \begin{bmatrix} W_0^{(8)} \\ W_1^{(8)} \\ W_2^{(8)} \\ W_3^{(8)} \\ W_4^{(8)} \\ W_5^{(8)} \\ W_6^{(8)} \\ W_7^{(8)} \end{bmatrix}$$

The orthogonal Walsh codes of the above mentioned Hadamard matrix $H^{(p)}$ have the following property ($p=2^n$).

Where $\{i, j, k\} \subset \{0, 2, 3, \ldots, 2^n - 2\}$. If i, j, k are represented by binary numbers as in EQUATION 6, $$i = (i_{n-1}, i_{n-2}, i_{n-3}, \ldots, i_1, i_0)_2, \; j = (j_{n-1}, j_{n-2}, j_{n-3}, \ldots, j_1, j_0)_2, \; k = (k_{n-1}, k_{n-2}, k_{n-3}, \ldots, k_1, k_0)_2 \quad \text{[EQUATION 6]}$$

the following relation holds among i, j, k:

$$(k_{n-1}, k_{n-2}, k_{n-3}, \ldots, k_1, k_0)_2 = (i_{n-1} \oplus j_{n-1}, i_{n-2} \oplus j_{n-2}, j_{n-3} \oplus j_{n-3}, \ldots, i_1 \oplus j_1, i_0 \oplus j_0)_Z \quad \text{[EQUATION 7]}$$

Here $\oplus$ represents the eXclusive OR (XOR) operator. Therefore, $W_i^{(p)}[n] = W_j^{(p)}[n] W_0^{(p)}[n]$ for $i \in \{0, 1, 2, \ldots, 2^n-1\}$, and $W_{2k+1}^{(p)}[n] = W_{2k}^{(p)}[n] W_1^{(p)}[n]$ for $k \in \{0, 1, 2, \ldots, 2^{n-1}-1\}$.

In order to distinguish the orthogonal multiple channels, the Hadamard matrix $H^{(p)}$ is used, and the order of the Hadamard matrix $H^{(p)}$, $p(=2^n)$ is the Spreading Factor (SF). In direct sequence spread spectrum communication systems, the spreading bandwidth is fixed, so the transmission chip rate is also fixed. When there are several channels having different data transmission rates with a fixed transmission chip rate, the tree-structured Orthogonal Variable Spreading Factor (OVSF) codes are used (as shown in EQUATION 8) in order to recover the desired channels at the receiving terminal using the orthogonal property of the channels.

The OVSF codes with conversion ("0"↔"+1" and "1"↔"−1") and orthogonal Walsh functions are shown in EQUATION 8 and EQUATION 9, respectively. An allocation method of the tree-structured OVSF codes with the orthogonal property is shown in the following references: (1) F. Adachi, M. Sawahashi and K. Okawa, "Tree-structured generation of orthogonal spreading codes with different lengths for forward link of DS-CDMA mobile radio, "Electronics Letters, Vol. 33, January 1997, pp27–28. (2) U.S. Pat. No. 5,751,761, "System and method for orthogonal spread spectrum sequence generation in variable data rate systems".

$$W_i^{(p)} \odot W_j^{(p)} \equiv (w_{i,0}^{(p)}, w_{i,1}^{(p)}, \ldots, w_{i,p-1}^{(p)}) \odot (w_{j,0}^{(p)}, w_{j,1}^{(p)}, \ldots, w_{j,p-1}^{(p)}) \quad \text{[EQUATION 5]}$$

$$= (w_{i,0}^{(p)} w_{j,0}^{(p)}, w_{i,1}^{(p)} w_{j,1}^{(p)}, \ldots, w_{i,p-1}^{(p)} w_{j,p-1}^{(p)})$$

$$= (w_{k,0}^{(p)}, w_{k,1}^{(p)}, \ldots, w_{k,p-1}^{(p)})$$

$$= W_k^{(p)}$$

[EQUATION 8]

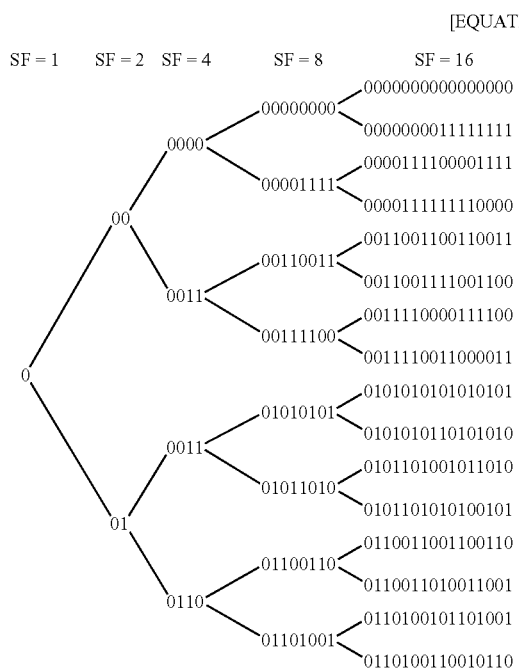

The above equation shows the OVSF codes.

[EQUATION 9]

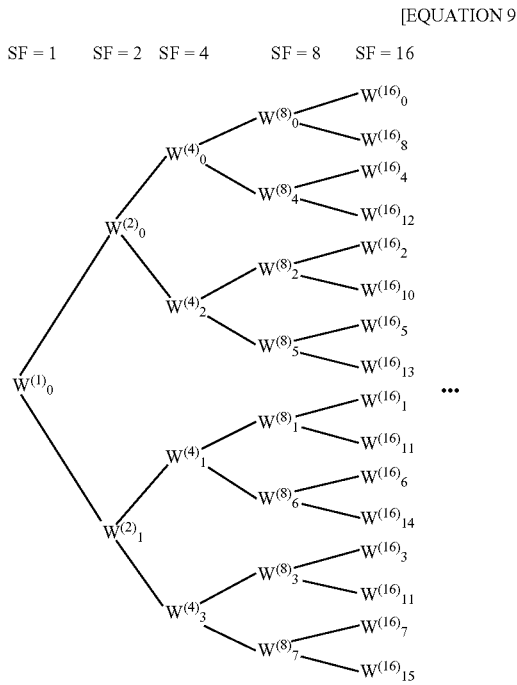

The above equation shows the relation between the OVSF codes and orthogonal Walsh codes.

The outputs ($x_T[n]$, $y_T[n]$) of the adder (130, 132) in FIG. 1 can be written as the following equations:

$$x_T[n] = G_P W_{HCH}[n] D_{HCH}\left[\left\lfloor \frac{n}{SF_{DCH}} \right\rfloor\right] +$$
$$G_D W_{DCCH}[n] D_{DCCH}\left[\left\lfloor \frac{n}{SF_{DCCH}} \right\rfloor\right] +$$
$$G_{S2} W_{SCH2}[n] D_{SCH2}\left[\left\lfloor \frac{n}{SF_{SCH2}} \right\rfloor\right]$$

$$y_T[n] = G_F W_{FCH}[n] D_{FCH}\left[\left\lfloor \frac{n}{SF_{FCH}} \right\rfloor\right] +$$
$$G_{S1} W_{SCH1}[n] D_{SCH1}\left[\left\lfloor \frac{n}{SF_{SCH1}} \right\rfloor\right]$$

[EQUATION 10]

Here $\lfloor x \rfloor$ is a largest integer not greater than x.

The above mentioned Walsh code $W_{PiCH}[n]$, $W_{DCCH}[n]$, $W_{SCH2}[n]$, $W_{SCH1}[n]$, and $W_{FCH}[n]$ are orthogonal Walsh functions selected from $H^{(SF_{PiCH})}$, $H^{(SF_{DCCH})}$, $H^{(SF_{SCH2})}$, $H^{(SF_{SCH1})}$, $H^{(SF_{FCH})}$. An allocation method of the orthogonal Walsh functions to each channel with the orthogonal property follows the allocation method of the OVSF codes. $SF_{PiCH}$, $SF_{DCCH}$, $SF_{SCH2}$, $SF_{SCH1}$, and $SF_{FCH}$ are spreading factors for the corresponding channels.

For simple explanation, assume the transmitting power of SCH1 and SCH2 is assumed to be statistically greater than the power of PiCH, DCCH, and FCH. (This assumption does not change the present invention.) In other words, it is assumed the relation $G_{S1} > G_P + G_D + G_F$, and $G_{S2} > G_P + G_D + G_F$, holds statistically. The above assumptions hold in two cases: In the first case, the transmission data rate for the supplementary channel (SCH1, SCH2) is greater than that of other channels (PiCH, DCCH, FCH), and the required quality such as the signal-to-noise ratio (SNR) for each channel is comparable. In the second case, the transmission data rates are comparable, and the required quality is more restricted. If there are only two channels available in a transmitter, the assumptions hold, and the two channels are allocated to SCH1 and SCH2. When the assumptions hold, EQUATION 10 can be approximated as EQUATION 11.

$$x_T[n] \simeq G_{S2} W_{SCH2}[n] D_{SCH2}\left[\left\lfloor \frac{n}{SF_{SCH2}} \right\rfloor\right]$$

$$y_T[n] \simeq G_{S1} W_{SCH1}[n] D_{SCH1}\left[\left\lfloor \frac{n}{SF_{SCH1}} \right\rfloor\right]$$

[EQUATION 11]

The spreading modulation takes place at the Spreading Modulator (140) with the first inputs ($x_T[n]$, $y_T[n]$) and the second inputs, PN (Pseudo-Noise) sequences ($C_1[n]$, $C_2[n]$), and the outputs ($I_T[n]$, $Q_T[n]$) are produced. The peak transmission power to the average power ratio (PAR: Peak-to-Average Ratio) can be improved according to the structure of the Spreading Modulator (140) and the method how to generate the scrambling codes ($C_{scramble, I}[n]$, $C_{scramble, Q}[n]$) from the inputs of the two PN sequences ($C_1[n]$, $C_2[n]$). Conventional embodiments for the Spreading Modulator (140) are shown in FIG. 3a~3d. The outputs ($I_T[n]$, $Q_T[n]$) of the Spreading Modulator (140) pass through the low-pass-filters (160, 162) and the power amplifiers (170, 172). Then the amplified outputs are delivered to the modulators (180, 182) which modulate the signals into the desired frequency band using carrier. And the modulator signals are added by the adder (190), and delivered to an antenna.

FIG. 2 shows a schematic diagram for a receiver according to the transmitter of FIG. 1. The received signals passed through an antenna are demodulated at the demodulators (280, 282) with the same carrier used at the transmitter, and $I_R[n]$ and $Q_R[n]$ are generated after passing through the low-pas filters (260, 262). Then, the spreading demodulator (240) generates the signals ($x_R[n]$, $y_R[n]$) with two PN sequences ($C_1[n]$, $C_2[n]$).

In order to pick up the desired channels, i.e., DCCH, FCH, SCH#1, SCH#2, among the received code division multiplexed signals ($x_R[n]$, $y_R[n]$), the signals are multiplied by the same orthogonal code $W_{xxCH}[n]$ (where, xxCH=DCCH or FCH) or $W_{yyCH}[n]$ (where, yyCH=SCH1 or SCH2) used at the transmitter, at the de-spreaders (224, 226, 225, 227). Now, the signals are integrated during the symbol period ($T_{2x}$ or $T_{2y}$) proportional to the data rate of the corresponding channel. Since the signals at the receiver are distorted, PiCH is used to correct the distorted signal phase. Therefore, the signals ($x_R[n]$, $y_R[n]$) are multiplied by the corresponding orthogonal code $W_{PiCH}[n]$, and are integrated during the period of $T_1$ at the integrators (210, 212).

When the PiCH includes additional information such as a control command to control the transmitting power at the receiver, besides the pilot signals for the phase correction, the additional information is extracted by the de-multiplexer, and the phase is estimate and corrected using the part of the pilot signals with the known phase. However, it is assumed that the PiCH does not include any additional information for simplicity. The phase corrections are performed at the second (kind) complex-domain multipliers (242, 246) using the estimated phase information through the integrators (210, 212). After selecting the output port according to the desired channel (DCCH, FCH, SCH1, or SCH2) at the second complex-domain multipliers (242, 246), the receiver recovers the transmitted data through the de-interleaver and/or the channel decoder (not shown in FIG. 2).

The first (143) and the second complex-domain multiplier (243 or 246) execute the following function.

[EQUATION 12]

Operations for the first complex-domain multipliers (143, 145):

$$O_I[n]+jO_Q[n]=(x_I[n]+jx_Q[n])(y_I[n]+jy_Q[n])$$

$$O_I[n]=x_I[n]y_I[n]-x_Q[n]y_Q[n]$$

$$O_Q[n]=x_I[n]y_Q[n]+x_Q[n]y_I[n]$$

Operations for the second complex-domain multipliers (242, 243, 245, 246):

$$O_I[n]+jO_Q[n]=(x_I[n]+jx_Q[n])(y_I[n]+jy_Q[n])$$

$$O_I[n]=x_I[n]y_I[n]+x_Q[n]y_Q[n]$$

$$O_Q[n]=-x_I[n]y_Q[n]+x_Q[n]y_I[n]$$

FIG. 7a and FIG. 7b show signal constellation diagrams. In FIG. 7a, a square represents the input ($x_I[n]+jx_Q[n]$) of the first complex-domain multiplier, and a circle shows a normalized output ($O_I[n]+jO_Q[n]$) of the first complex-domain multiplier. FIG. 7b shows four transitions (0, +π/2, −π/2, π) of the first complex-domain multiplier input ($x_I$ [n]+jx_Q[n]$) according to the time flow. The PAR characteristic becomes worse at the origin crossing transition (or π-transition) in FIG. 7b.

FIG. 3a shows the schematic diagram for a conventional spreading modulator. This spreading modulation method is used in the forward link (from a base station to its mobile station) for a CDMA system of IS-95 method. This spreading modulation is called the QPSK (Quadrature Phase Shift Keying) spreading modulation.

$$I_T[n]=x_T[n]C_{scramble,I}[n] \qquad \text{[EQUATION 13]}$$

$$Q_T[n]=y_T[n]C_{scramble,Q}[n]$$

The outputs ($C_{scramble,I}[n]$, $C_{scramble,Q}[n]$) of the secondary scrambling code generator shown in FIG. 4a are given by EQUATION 14. In other words, the secondary scrambling codes are the same as the primary scrambling codes.

$$C_{scramble,I}[n]=C_1[n] \qquad \text{[EQUATION 14]}$$

$$C_{scramble,Q}[n]=C_2[n]$$

In the IS-95 system, $x_T[n]=y_T[n]$, but generally $x_T[n] \ne y_T[n]$ in the QPSK spreading modulation. For $|I_T[n]|=|Q_T[n]|=1$ based on the normalization, the possible transitions of the signal constellation point occurring in the QPSK spreading modulation are shown in EQUATION 15. The probability for {0, +π/2, −π/2, π} transition is equally 1/4 for each transition.

$$\arg\left(\frac{I_T[n+1]+jQ_T[n+1]}{I_T[n]+jQ_T[n]}\right) \in \left\{0, +\frac{\pi}{2}, -\frac{\pi}{2}, \pi\right\}$$

FIG. 8a shows the transitions of the signal constellation point for the QPSK spreading modulation when $I_T[n]=\pm 1$, $Q_T[n]=\pm 1$, and SF=4. For n≡0 mod SF, ($I_T[n]$, $Q_T[n]$) becomes one of (+1, +1), (+1, −1), (−1, −1), (−1, +1) with an equal probability of 1/4. The transition is assumed to start at (+1, +1). There is no change in the signal constellation diagram at a chip time of n+1/2. At a chip time of n+1, ($I_T[n]$, $Q_T[n]$) transits to one of (+1, +1), (+1, −1), (−1, −1), (−1, +1) with an equal probability of 1/4. FIG. 8a shows the case of (+1, −1) transition.

There is no change in the signal constellation diagram at a chip time of n+3/2. At a chip time of n+2, ($I_T[n]$, $Q_T[n]$) transits to one of (+1, +1), (+1, −1), (−1, −1), (−1, +1) with an equal probability of 1/4. FIG. 8a shows the case of (−1, +1) transition. The PAR characteristic becomes worse in this case due to an origin crossing transition (π-transition).

There is no change in the signal constellation diagram at a chip time of n+5/2. At a chip time of n+3, ($I_T[n]$, $Q_T[n]$) transits to one of (+1, +1), (+1, −1), (−1, −1), (−1, +1) with an equal probability of 1/4. FIG. 8a shows the case of (−1, −1) transition.

There is no change in the signal constellation diagram at a chip time of n+7/2. At a chip time of n+4, ($I_T[n]$, $Q_T[n]$) transits to one of (+1, +1), (+1, −1), (−1, −1), (−1, +1) with an equal probability of 1/4. The above transition process is repeated according to the probability.

FIG. 3b shows a schematic diagram for another conventional spreading modulator. This spreading modulation method is used in the reverse link (from a mobile station to its base station) for the IS-95 CDMA system. This spreading modulation is called the OQPSK (Offset QPSK) spreading modulation, and the output signals are governed by EQUATION 16.

$$I_T[n] = x_T[n]C_{scramble,I}[n] \qquad \text{[EQUATION 16]}$$

$$Q_T[n] = y_T\left[n-\frac{1}{2}\right]C_{scramble,Q}\left[n-\frac{1}{2}\right]$$

The outputs ($C_{scramble,I}[n]$, $C_{scramble,Q}[n]$) of the secondary scrambling code generator in FIG. 4a are given by EQUATION 17. In other words, the secondary scrambling codes are the same as the primary scrambling codes, as in the previous QPSK spreading modulation.

$$C_{scramble,I}[n] = C_1[n] \qquad \text{[EQUATION 17]}$$

$$C_{scramble,Q}[n] = C_2[n]$$

Generally $x_T[n] \neq y_T[n]$ in OQPSK spreading modulation. For $|I_T[n]| = |Q_T[n]| = 1$ based on the normalization, the possible transitions of the signal constellation point occurring in the QPSK spreading modulation are shown in EQUATION 18. The probabilities for $\{0, +\pi/2, -\pi/2, \pi\}$ transitions are 1/2, 1/4, 1/4, 0, respectively.

$$\arg\left(\frac{I_T[n+1/2] + jQ_T[n+1/2]}{I_T[n] + jQ_T[n]}\right) \in \{0, +\frac{\pi}{2}, -\frac{\pi}{2}\} \qquad \text{[EQUATION 18]}$$

-continued $$\arg\left(\frac{I_T[n+1] + jQ_T[n+1]}{I_T[n+1/2] + jQ_T[n+1/2]}\right) \in \{0, +\frac{\pi}{2}, -\frac{\pi}{2}\}$$

In OQPSK spreading modulation shown in FIG. 3b, the signal of the orthogonal phase channel (Q-channel) is delayed by a half cup (Tc/2) relative to the signal of the in-phase channel (I-channel) in order to improve the PAR characteristic of QPSK spreading modulation in FIG. 3a. Due to a half chip (Tc/2) delay, the codes of the I-channel and Q-channel signals cannot be changed simultaneously. Thus, the π-transition crossing the origin is prohibited, and the PAR characteristic is improved.

FIG. 8b shows the transitions of the signal constellation point for the OQPSK spreading modulation when $I_T[n] = \pm 1$, $Q_T[n] = \pm 1$, and SF=4. For n≡0 mod SF, $(I_T[n], Q_T[n])$ becomes one of (+1, +1), (+1, −1), (−1, −1), (−1, +1) with an equal probability of 1/4. The transition is assumed to start at (+1, +1). At a chip time of n+1/2, $(I_T[n], Q_T[n])$ transits to either (+1, +1) or (+1, −1) with an equal probability of 1/2. FIG. 8b shows the case of (+1, +1) transition: At a chip time of n+1, $(I_T[n], Q_T[n])$ transits to either (+1, +1) or (−1, +1) with an equal probability of 1/2. FIG. 8b shows the case of (+1, +1) transition: At a chip time of n+3/2, $(I_T[n], Q_T[n])$ transits to either (+1, +1) or (+1, −1) with an equal probability of 1/2. FIG. 8b shows the case of (+1, −1) transition: At a chip time of n+2, $(I_T[n], Q_T[n])$ transits to either (+1, −1) or (−1, −1) with an equal probability of 1/2. FIG. 8b shows the case of (−1, −1) transition: At a chip time of n+5/2, $(I_T[n], Q_T[n])$ transits to either (−1, −1) or (−1, +1) with an equal probability of 1/2. FIG. 8b shows the case of (−1, +1) transition: At a chip time of n+3, $(I_T[n], Q_T[n])$ transits to either (+1, +1) or (−1, +1) with an equal probability of 1/2. FIG. 8b shows the case of (−1, +1) transition: At a chip time of n+7/2, $(I_T[n], Q_T[n])$ transits to either (−1, +1) or (−1, −1) with an equal probability of 1/2. FIG. 8b shows the case of (−1, −1) transition: At a chip time of n+4, $(I_T[n], Q_T[n])$ transits to either (+1, −1) or (−1, −1) with an equal probability of 1/2. The above transition process is repeated according to the probability.

FIG. 3c shows a schematic diagram for another conventional spreading modulator. This spreading modulation method is subdivided into three methods according to the scrambling code generator (150). The first method is used in the forward link (from a base station to its mobile station) for a W-CDMA (Wideband CDMA) system as another candidate for cdma2000 or IMT-2000 system. This spreading modulation is called the CQPSK (Complex QPSK) spreading modulation, and the output signals are governed by EQUATION 19.

$$I_T[n] + jQ_T[n] = (x_T[n] + jy_T[n])\left\{\frac{1}{\sqrt{2}}(C_{scramble,I}[n] + jC_{scramble,Q}[n])\right\} \qquad \text{[EQUATION 19]}$$

$$I_T[n] = \frac{1}{\sqrt{2}} x_T[n] C_{scramble,I}[n] - \frac{1}{\sqrt{2}} y_T[n] C_{scramble,Q}[n]$$

$$Q_T[n] = \frac{1}{\sqrt{2}} x_T[n] C_{scramble,Q}[n] - \frac{1}{\sqrt{2}} y_T[n] C_{scramble,I}[n]$$

The outputs ($C_{scramble,I}[n]$, $C_{scramble,Q}[n]$) of the secondary scrambling code generator in FIG. 4a are given by EQUATION 20. In other words, the secondary scrambling codes are the same as the primary scrambling codes, as described in the previous QPSK and OQPSK spreading modulation.

$$C_{scramble,I}[n] = C_1[n] \qquad \text{[EQUATION 20]}$$

$$C_{scramble,Q}[n] = C_2[n]$$

Generally $x_T[n] \neq y_T[n]$ in CQPSK spreading modulation. For $|I_T[n]| = |Q_T[n]| = 1$ based on the normalization, the possible transitions of the signal constellation point occurring in the CQPSK spreading modulation are shown in EQUATION 21. The probability for $\{0, +\pi/2, -\pi/2, \pi\}$ transition is equally 1/4 for each transition.

$$\arg\left(\frac{I_T[n+1] + jQ_T[n+1]}{I_T[n] + jQ_T[n]}\right) \in \{0, +\frac{\pi}{2}, -\frac{\pi}{2}, \pi\} \qquad \text{[EQUATION 21]}$$

The previous OQPSK method is effective when the I-channel and Q-channel powers are the same as in IS-95 reverse link channels. But the Q-channel signal should be delayed by a half chip, and the amplitude of the transmitting power for I-channel is different from that for Q-channel in the case of FIG. 1 when several channels with different transmitting powers are using orthogonal channels. The linear range of the amplifier should be selected based upon the largest transmitting signal power in order to reduce the neighboring channel interference from the signal distortion and the inter-modulation.

On the other hand, in CQPSK spreading modulation, I-channel signal ($x_T[n]$) and Q-channel signal ($y_T[n]$) are multiplied in complex-domain by the secondary scrambling codes, $C_{scramble,I}[n]$ and $C_{scramble,Q}[n]$ of the same amplitude. Therefore, the smaller of signal power level of the two (I and Q) become large, and the larger of signal power level of the two becomes small; the two signal power levels are equalized statistically. The CQPSK spreading modulation is more effective to improve the PAR characteristic when there are multiple channels with different power levels. In the CQPSK spreading modulation, $x_T[n]+jy_T[n]$ makes an origin crossing transition (π-transition) with a probability of 1/4.

FIG. 8c shows the transitions of the signal constellation point for the CQPSK spreading modulation when $x_T[n]=\pm 1$, $y_T[n]=\pm 1$, $I_T[n]=\pm 1$, $Q_T[n]=\pm 1$, and SF=4. For n≡0 mod SF, $x_T[n]+jy_T[n]$ and $C_{scramble,I}[n]+jC_{scramble,Q}[n]$ become one of 1+j, 1−j, −1−j, −1+j with an equal probability of 1/4, and it is assumed that $x_T[n]+jy_T[n]=1+j$ and $C_{scramble,I}[n]+jC_{scramble,Q}[n]=1+j$; in other words, in this case, $I_T[n]+jQ_T[n]=0+j\sqrt{2}$. And this equation becomes $I_T[n]+jQ_T[n]=0+j1$ due to the normalization. There is no change in the signal constellation diagram at a chip time of n+1/2. At a chip time of n+1, $x_T[n]+jy_T[n]$ transits to one of 1+j, 1−j, −1−j, and −1+j, and $C_{scramble,I}[n]+jC_{scramble,Q}[n]$ also transits to one of 1+j, 1−j, −1−j, and −1+j.

The second method is used in the reverse link (from a mobile station to its base station) for a G-CDMA (Global-CDMA) I and II systems as another candidate for IMT-2000 system proposed at International Telecommunications Union (ITU, http://www.itu.int) in June 1998. This spreading modulation is called the OCQPSK (Orthogonal Complex QPSK) spreading modulation referring to Korean Patent NO. 10-269593-0000. The following relations hold when only an even number is assigned to the subscript of the orthogonal Walsh code for each channel.

$$x_T[2n] \simeq x_T[2n+1]$$ [EQUATION 22]

$$y_T[2n] \simeq y_T[2n+1]$$

$$I_T[n] + jQ_T[n] = (x_T[n] + jy_T[n])$$

$$\left\{ \frac{1}{\sqrt{2}} (C_{scramble,I}[n] + jC_{scramble,Q}[n]) \right\}$$

$$I_T[n] = \frac{1}{\sqrt{2}} x_T[n] C_{scramble,I}[n] - \frac{1}{\sqrt{2}} y_T[n] C_{scramble,Q}[n]$$

$$Q_T[n] = \frac{1}{\sqrt{2}} x_T[n] C_{scramble,Q}[n] +$$

$$\frac{1}{\sqrt{2}} y_T[n] C_{scramble,I}[n]$$

The outputs ($C_{scramble,I}[n]$, $C_{scramble,Q}[n]$) of the secondary scrambling code generator in FIG. 4b are given by EQUATION 23. Since $W_0^{(p)}[n]=1$, the secondary scrambling code generators in FIG. 4b and FIG. 4c are the same for k=0.

$$C_{scramble,I}[n]+jC_{scramble,Q}[n]=C_1[n](W_{2k}^{(p)}[n]+jW_{2k+1}^{(p)}[n])$$ [EQUATION 23]

$$C_{scramble,I}[n]=C_1[n]W_{2k}^{(p)}[n]$$

$$C_{scramble,Q}[n]=C_1[n]W_{2k+1}^{(p)}[n]$$

Where p is a power of 2 (i.e., $p=2^n$), and $$k \in \left\{ 0, 1, 2, \cdots, \frac{p}{2} - 1 \right\}$$

Generally $x_T[n] \neq y_T[n]$ in OCQPSK spreading modulation. For $|I_T[n]|=|Q_T[n]|=1$ based on the normalization, the possible transitions of the signal constellation point occurring in the OCQPSK spreading modulation are shown in EQUATION 24. The probabilities for {0, +π/2, −π/2, π} transitions are 0, 1/2, 1/2, and 0 for n=2t+1 (odd number), and 1/4, 1/4, 1/4, and 1/4 in case of n=2t (even number) for each transition, respectively.

$$\frac{I_T[n+1] + jQ_T[n+1]}{I_T[n] + jQ_T[n]} = \frac{(x_T[n+1] + jy_T[n+1])(C_{scramble,I}[n+1] + jC_{scramble,Q}[n+1])}{(x_T[n] + jy_T[n])(C_{scramble,I}[n] + jC_{scramble,Q}[n])}$$ [EQUATION 24]

$$= \frac{x_T[n+1] + jy_T[n+1]}{x_T[n] + jy_T[n]} \cdot \frac{C_1[n+1](W_{2k}^{(p)}[n+1] + jW_{2k+1}^{(p)}[n+1])}{C_1[n](W_{2k}^{(p)}[n] + jW_{2k+1}^{(p)}[n])}$$

$$\arg\left\{ \frac{I_T[2t+1] + jQ_T[2t+1]}{I_T[2t] + jQ_T[2t]} \right\} \in \left\{ +\frac{\pi}{2}, -\frac{\pi}{2} \right\}$$

$$\arg\left\{ \frac{I_T[2t+2] + jQ_T[2t+2]}{I_T[2t+1] + jQ_T[2t+1]} \right\} \in \left\{ 0, +\frac{\pi}{2}, -\frac{\pi}{2}, \pi \right\}$$

In the OCQPSK spreading modulation, the following properties are used:

For $W_{2k}^{(p)}[n]$, $$k \in \left\{ 0, 1, 2, \ldots, \frac{P}{2} - 1 \right\};$$

$W_{2k}^{(p)}[2t] = W_{2k}^{(p)}[2t+1]$, t∈{0, 1, 2, . . . }.

And for $W_{2k+1}^{(p)}[n]$, $$k \in \left\{ 0, 1, 2, \ldots, \frac{P}{2} - 1 \right\};$$

$W_{2k+1}^{(p)}[2t] = -W_{2k+1}^{(p)}[2t+1]$, t∈{0, 1, 2, . . . }.

The orthogonal Walsh codes with even number subscripts are used for the channel identification except for the case when the orthogonal Walsh codes with odd number subscripts must be used for the channel identification due to the high transmitting data rate. Because $x_T[2t]=x_T[2t+1]$, $y_T[2t]=y_T[2t+1]$, $t\in\{0, 1, 2, \ldots\}$, the following approximation holds as described in EQUATION 25.

$$x_T[n] + jy_T[n] \simeq G_{S2}W_{SCH2}[n]D_{SCH2}\left[\left\lfloor\frac{n}{SF_{SCH2}}\right\rfloor\right] + \quad\quad \text{[EQUATION 25]}$$

$$jG_{S1}W_{SCH1}[n]D_{SCH1}\left[\left\lfloor\frac{n}{SF_{SCH1}}\right\rfloor\right]$$

In the OCQPSK spreading modulation, avoiding the origin crossing transition (π-transition) which makes worse the PAR characteristic for n=2t+1, the PAR characteristic of the spreading signals is improved compared to the CQPSK spreading modulation. At n=2t, $x_T[n]+jy_T[n]$ makes an origin crossing transition (π-transition) with a probability of 1/4 as in the CQPSK spreading modulation, while, at n=2t+1, the corresponding probability is zero. Therefore, the average probability for the origin crossing transition (π-transition) decreases to 1/8 from 1/4. $C_1[n]$ for the scrambling in FIG. 4b is also used in identifying the transmitter.

The third method is used in the reverse link (from a mobile station to its base station) for a W-CDMA system as another candidate for cdma2000 and IMT-2000 system. This spreading modulation is POCQPSK (Permuted Orthogonal Complex QPSK) spreading modulation referring to Korean Patent NO. 10-269593-0000. The following relations hold when only an even number is assigned to the subscript of the orthogonal Walsh code for each channel.

The outputs ($C_{scramble,I}[n]$, $C_{scramble,Q}[n]$) of the secondary scrambling code generator in FIG. 4d are given by EQUATION 27.

$$C_{scramble,I}[n]+jC_{scramble,Q}[n]=C_1[n](W_{2k}^{(p)}[n]+jC'_2[n]W_{2k+1}^{(p)}[n]) \quad \text{[EQUATION 27]}$$

$$C_{scramble,I}[n]=C_1[n]W_{2k}^{(p)}[n]$$

$$C_{scramble,Q}[n]=C_1[n]C'_2[n]W_{2k+1}^{(p)}[n]$$

$$C'_2[2t]=C'_2[2t+1]=C_2[2t], \ t\in\{0, 1, 2, \ldots\}$$

Generally $x_T[n]\neq y_T[n]$ in POCQPSK spreading modulation. For $|I_T[n]|=|Q_T[n]|=1$ based on the normalization, the possible transitions of the signal constellation point occurring in the POCQPSK spreading modulation are shown in EQUATION 28. The probabilities for $\{0, +\pi/2, -\pi/2, \pi\}$ transition is 0, 1/2, 1/2, and 0 for n=2t+1 (odd number), and 1/4, 1/4, 1/4, and 1/4 in case of n=2t (even number) for each transition, respectively.

$$x_T[2n] \simeq x_T[2n+1] \quad\quad \text{[EQUATION 26]}$$

$$y_T[2n] \simeq y_T[2n+1]$$

$$I_T[n] + jQ_T[n] = (x_T[n] + jy_T[n])\left\{\frac{1}{\sqrt{2}}(C_{scramble,I}[n] + jC_{scramble,Q}[n])\right\}$$

$$I_T[n] = \frac{1}{\sqrt{2}}x_T[n]C_{scramble,I}[n] - \frac{1}{\sqrt{2}}y_T[n]C_{scramble,Q}[n]$$

$$Q_T[n] = \frac{1}{\sqrt{2}}x_T[n]C_{scramble,Q}[n] + \frac{1}{\sqrt{2}}y_T[n]C_{scramble,I}[n]$$

$$\frac{I_T[2t+2]+jQ_T[2t+2]}{I_T[2t+1]+jQ_T[2t+1]} = \frac{(x_T[2t+2]+jy_T[2t+2])(C_{scramble,I}[2t+2]+jC_{scramble,Q}[2t+2])}{(x_T[2t+1]+jy_T[2t+1])(C_{scramble,I}[2t+1]+jC_{scramble,Q}[2t+1])} =$$

$$\frac{x_T[2t+2]+jy_T[2t+2]}{x_T[2t+1]+jy_T[2t+1]} \cdot \frac{W_{2k}^{(p)}[2t+2]}{W_{2k}^{(p)}[2t+1]} \cdot \frac{C_1[2t+2]}{C_1[2t+1]} \cdot \frac{1+jC'_2[2t+2]W_1^{(p)}[2t+2]}{1+jC'_2[2t+1]W_1^{(p)}[2t+1]}$$

$$\arg\left\{\frac{I_T[2t+2]+jQ_T[2t+2]}{I_T[2t+1]+jQ_T[2t+1]}\right\} \in \left\{0,+\frac{\pi}{2},-\frac{\pi}{2},\pi\right\}$$

$$\frac{I_T[2t+1]+jQ_T[2t+1]}{I_T[2t]+jQ_T[2t]} = \frac{x_T[2t+1]+jy_T[2t+1]}{x_T[2t]+jy_T[2t]} \cdot \frac{C_{scramble,I}[2t+1]+jC_{scramble,Q}[2t+1]}{C_{scramble,I}[2t]+jC_{scramble,Q}[2t]}$$

$$= \frac{C_1[2t+1]}{C_1[2t]} \cdot \frac{W_{2k}^{(p)}[2t+1]+jC'_2[2t+1]W_{2k+1}^{(p)}[2t+1]}{W_{2k}^{(p)}[2t]+jC'_2[2t]W_{2k+1}^{(p)}[2t]}$$

$$= \frac{C_1[2t+1]}{C_1[2t]} \cdot \frac{1-jC'_2[2t]W_1^{(p)}[2t]}{1+jC'_2[2t]W_1^{(p)}[2t]}$$

$$\arg\left\{\frac{I_T[2t+1]+jQ_T[2t+1]}{I_T[2t]+jQ_T[2t]}\right\} \in \left\{+\frac{\pi}{2},-\frac{\pi}{2}\right\}$$

The POCQPSK spreading modulation is basically the same as the OCQPSK spreading modulation. Therefore, at n=2t, $x_T[n]+jy_T[n]$ makes an origin crossing transition ($\pi$-transition) with a probability of 1/4 as described in the CQPSK spreading modulation, while, at n=2t+1, the corresponding probability is zero. $C'_2[n]$ decimated from $C_2[n]$ is used in order to compensate for the lack of the randomness due to a periodic repetition of the orthogonal Walsh functions. The decimation should be made with the following properties: For t∈{0, 1, 2, . . . } and $$k \in \left\{0, 1, 2, \ldots, \frac{P}{2}-1\right\},$$

$W_{2k+1}^{(p)}[2t]=-W_{2k+1}^{(p)}[2t+1]$, and $C'_2[2t]W_{2k+1}^{(p)}[2t]=-C'_2[2t+1]W_{2k+1}^{(p)}[2t+1]$.

Even though $C_2[n]$ is decimated to 2:1 in the above case, $2^d$:1 decimation for d∈{1, 2, 3, . . . } is also possible. When $2^d$=max{$SF_{PiCH}$, $SF_{DCCH}$, $SF_{SCH2}$, $SF_{SCH1}$, $SF_{FCD}$}, the randomness of the POCQPSK is the same as that of the OCQPSK, and the randomness becomes high for 2:1 decimation with d=1. $C_1[n]$ and $C_2[n]$ for the scrambling to obtain the better spectrum characteristic are also used to identify the transmitter through the auto-correlation and the cross-correlation. The number of identifiable transmitters increases when both of $C_2[n]$ and $C_2[n]$ are used as the scrambling codes.

FIG. 9 and FIG. 10 show schematic diagrams for a transmitter and a receiver using the POCQPSK spreading modulation. FIG. 9 shows a schematic diagram for the transmitter based on the cdma2000 system, which is one of the candidates for IMT-2000 system as a third generation mobile communication system. The transmitter has five orthogonal channels: PiCH, DCCH, FCH, SCH1, and SCH2. Each channel performs the signal conversion process by changing a binary data {0, 1} into {+1, −1}.

The gain controlled signal for each channel is spread at the spreader (120, 122, 124, 126, 128) with the orthogonal OVSF code $W_{PiCH}[n]$, $W_{DCCH}[n]$, $W_{SCH2}[n]$, $W_{SCH1}[n]$, or $W_{FCH}[n]$, and is delivered to the adder (130, 132). The spreading modulation takes place at the Spreading Modulator (140) with the first inputs ($x_T[n]$, $y_T[n]$) and the second inputs (the primary scrambling codes; $C_1[n]$ and $C_2[n]$), and the outputs ($I_T[n]$, $Q_T[n]$) are generated. The spreading modulator (140) comprises the scrambling code generator (510) and the first complex-domain multiplier (143). The scrambling code generator (510) produces the secondary scrambling codes ($C_{scramble,\,I}[n]$, $C_{scramble,\,Q}[n]$) with the primary scrambling codes ($C_1[n]$, $C_2[n]$) as the inputs to improve the PAR characteristic. The first complex-domain multiplier (143) takes $x_T[n]$ and $y_T[n]$ as inputs and the secondary scrambling codes ($C_{scramble,\,I}[n]$, $C_{scramble,\,Q}[n]$) as another inputs.

The primary scrambling codes ($C_1[n]$, $C_2[n]$) in the cdma2000 system is produced by the primary scrambling code generator (550) using three PN sequences ($PN_I[n]$, $PN_Q[n]$, $PN_{long}[n]$) as shown in FIG. 5a with the following equation:

$$C_1[n]=PN_I[n]PN_{long}[n] \quad \text{[EQUATION 29]}$$

$$C_2[n]=PN_Q[n]PN_{long}[n-1]$$

The secondary scrambling codes ($C_{scramble,\,I}[n]$, $C_{scramble,\,Q}[n]$) are given by the following equation:

$$C_{scramble,I}[n]=C_1[n]W_0^{(p)}[n]=C_1[n] \quad \text{[EQUATION 30]}$$

$$C_{scramble,Q}[n]=C_1[n]C'_2[n]W_1^{(p)}[n]$$

$$C'_2[2t]=C'_2[2t+1]=C_2[2t],\ t\in\{0,1,2,\ldots\}$$

The outputs ($I_T[n]$, $Q_T[n]$) of the Spreading Modulator (140) pass through the low-pass filters (160, 162) and power amplifiers (170, 172). Then the amplified outputs are delivered to the modulators (180, 182) which modulate the signals into the desired frequency band using a carrier. And the modulated signals are added by the adder (190), and delivered to an antenna.

FIG. 10 shows a schematic diagram for a receiver according to the transmission of FIG. 9. The received signals through an antenna are demodulated at the demodulators (280, 282) with the same carrier used at the transmitter, and $I_R[n]$ and $Q_R[n]$ are generated after the signals pass through the low-pass filters (260, 262). Then, the spreading demodulator (240) produces the signals ($x_R[n]$, $y_R[n]$) with the primary scrambling codes ($C_1[n]$, $C_2[n]$). The spreading demodulator (240) comprises the scrambling code generator (510) and the second complex-domain multiplier (243). The scrambling code generator (510) produces the secondary scrambling codes ($C_{scramble,\ I[n]}$, $C_{scramble,\ Q}[n]$) with the primary scrambling codes ($C_1[n]$, $C_2[n]$) as the inputs to improve the PAR characteristic. The second complex-domain multiplier (243) in the spreading demodulator (240) takes the $I_R[n]$, $Q_R[n]$ as the first inputs and the secondary scrambling codes ($C_{scramble,\ I}[n]$, $C_{scramble,\ Q}[n]$) as the second inputs. The first and secondary scrambling codes are generated by the same method as in the transmitter.

In order to select the desired channels among the outputs ($x_R[n]$, $y_R[n]$) of the spreading demodulator (240), the signals are multiplied by the same orthogonal code $W_{xxCH}[n]$ (where, xxCH=DCCH or FCH) or $W_{yyCH}[n]$ (where, yyCH=SCH1 or SCH2) used at the transmitter, at the despreaders (224, 226, 225, 227). Then, the signals are integrated during the symbol period $T_{2x}$ or $T_{2y}$. Since the signals at the receiver are distorted, PiCH is used to correct the distorted signal phase. Therefore, the signals ($x_R[n]$, $y_R[n]$) are multiplied by the corresponding orthogonal code $W_{PiCH}[n]$, and are integrated during the period of $T_1$ at the integrators (210, 212).

The reverse link PiCH in the cdma2000 system may include additional information such as a control command to control the transmitting power at the receiver, besides the pilot signals for the phase correction. In this case, the additional information is extracted by the de-multiplexer, and the phase is estimated using the part of the pilot signals having the known phase. The phase corrections are performed at the second (kind) complex-domain multipliers (242, 246) shown in the left of FIG. 10 using the estimated phase information through the integrators (210, 212).

However, the conventional CDMA systems have two problems: The first problem is that the strict condition for the linearity of the power amplifier is required. The second problem is when there are several transmitting channels, the signal distortion and the neighboring frequency interference should be reduced. Therefore, the expensive power amplifiers with the better linear characteristic are required.

DISCLOSURE OF THE INVENTION

The object of this invention is to provide a method and an apparatus for the spreading modulation method in CDMA spread spectrum communication systems to solve the above mentioned problems. In the spreading modulation method according to this invention, the probability for the spread signals ($x_T[n]+jy_T[n]$) to make the origin crossing transition ($\pi$-transition) becomes zero not only at n=2t+1, t∈{0, 1, 2, . . . } as in cases of the OCQPSK and POCQPSK spreading modulation but also at n=2t only except for the time n≡0 (mod min{$SF_{PiCH}$, $SF_{DCCH}$, $SF_{SCH2}$, $SF_{SCF1}$, $SF_{FCH}$}) when the spreading transmitting data vary. Therefore, the PAR characteristic is improved by using the proposed spreading modulation scheme. In other words, this invention provides a method and an apparatus for the spreading modulation method with improved PAR characteristic in CDMA spread spectrum communication systems.

In accordance with an aspect of this invention an apparatus and a method for spreading modulation are invented in CDMA systems with a transmitter and receivers.

The transmitter according to the proposed invention has several channels with different information. Each channel spreads with the orthogonal codes using a complex-domain multiplier in addition to the conventional spreaders, and the spread signals are added. Then the signals are scrambled with the PN sequences, are modulated with a carrier, and are delivered to an antenna.

The receiver according to the invention demodulates the received signals with the same carrier used in the transmitter. The demodulated mixed signals are de-scrambled with the same synchronized PN sequences, and the de-scrambled signals are de-spread with the same synchronized orthogonal codes using a complex-domain multiplier in addition to the conventional de-spreaders. Then the desired information is recovered at the receiver with the conventional signal processing.

In a preferred embodiment, the transmitter according to the invention has an additional complex-domain multiplier and a special scrambling code generator. The probability for the spread signals ($x_T[n]+jy_T[n]$) to make the origin crossing transition ($\pi$-transition) becomes zero not only for n=2t+1, t∈{0, 1, 2, . . . } but also for n=2t only except for the time n≡0 (mod min {$SF_{PiCH}$, $SF_{DCCH}$, $SF_{SCH2}$, $SF_{SCH1}$, $SF_{FCH}$}) when the spread transmitting data vary.

BRIEF DESCRIPTION OF THE DRAWINGS

Exemplary embodiments of the present invention will be described in conjunction with the drawings in which:

FIG. 5b shows a general diagram for the secondary scrambling code generator in FIG. 5a;

FIG. 12 shows a schematic diagram for a receiver according to the transmitter of FIG. 11a.

Figure 1:
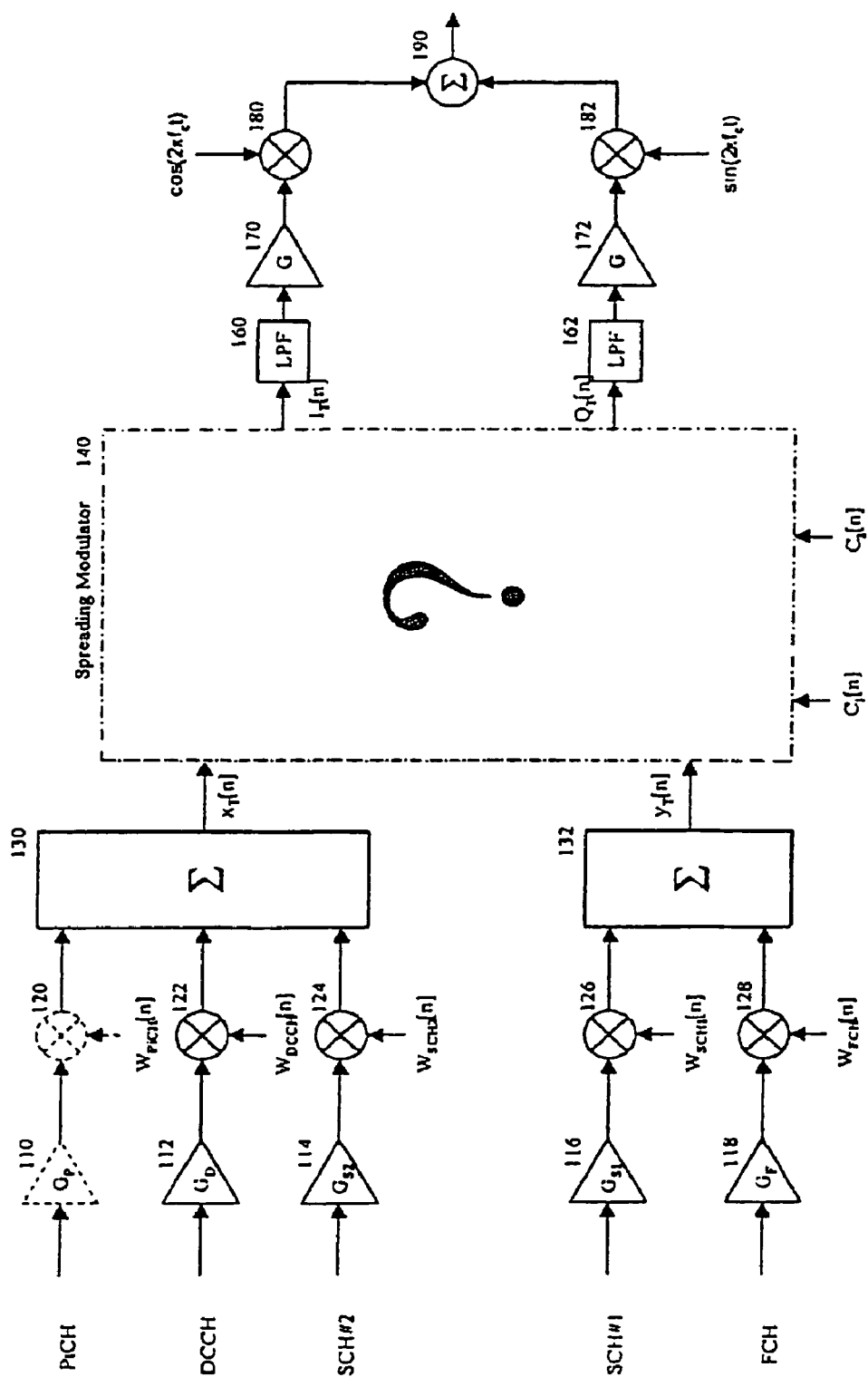
FIG. 1 shows a schematic diagram for a conventional CDMA transmitter with orthogonal multiple channels.
Figure 2:
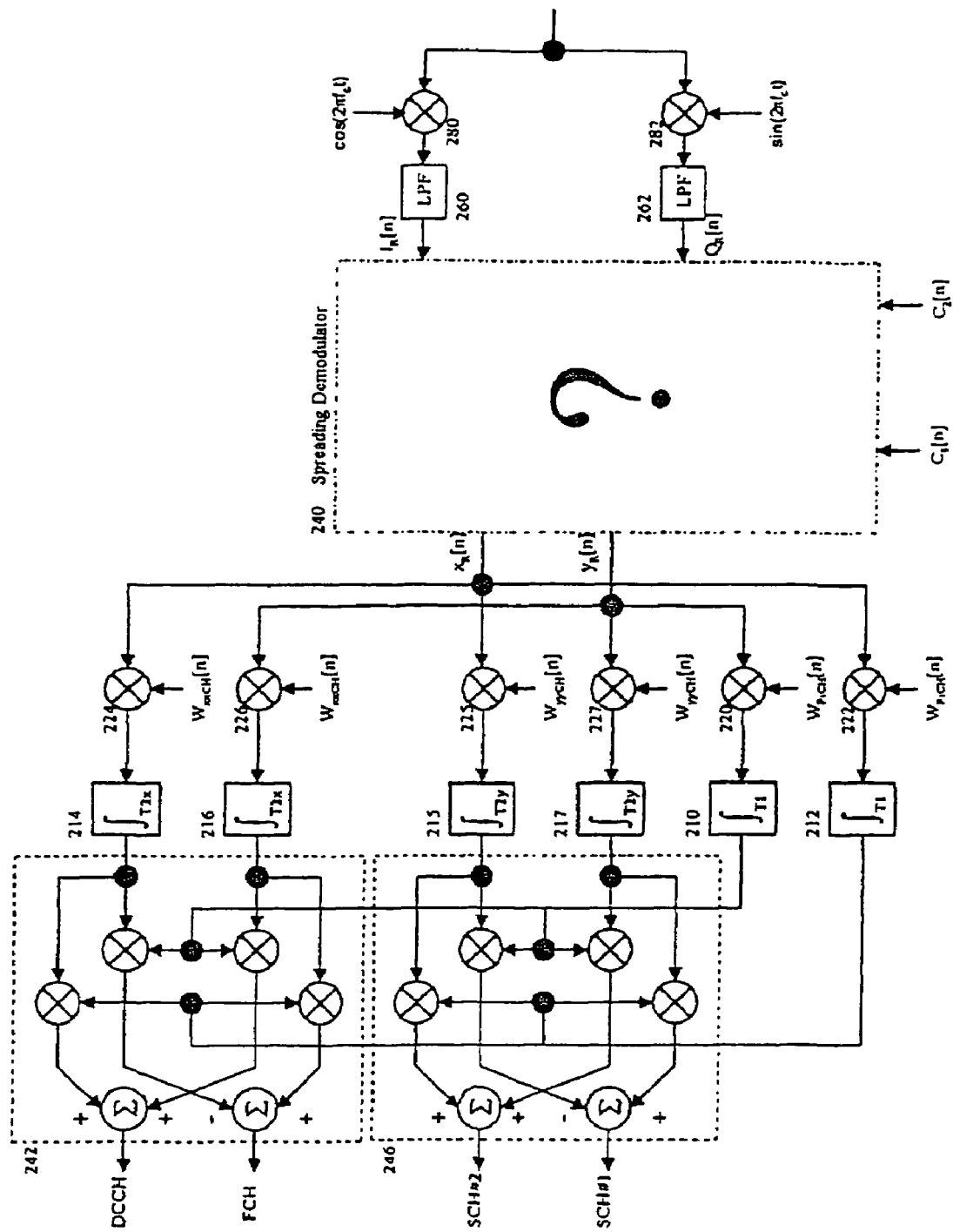
FIG. 2 shows a schematic diagram for a receiver according to the transmitter of FIG. 1.
Figure 3A:
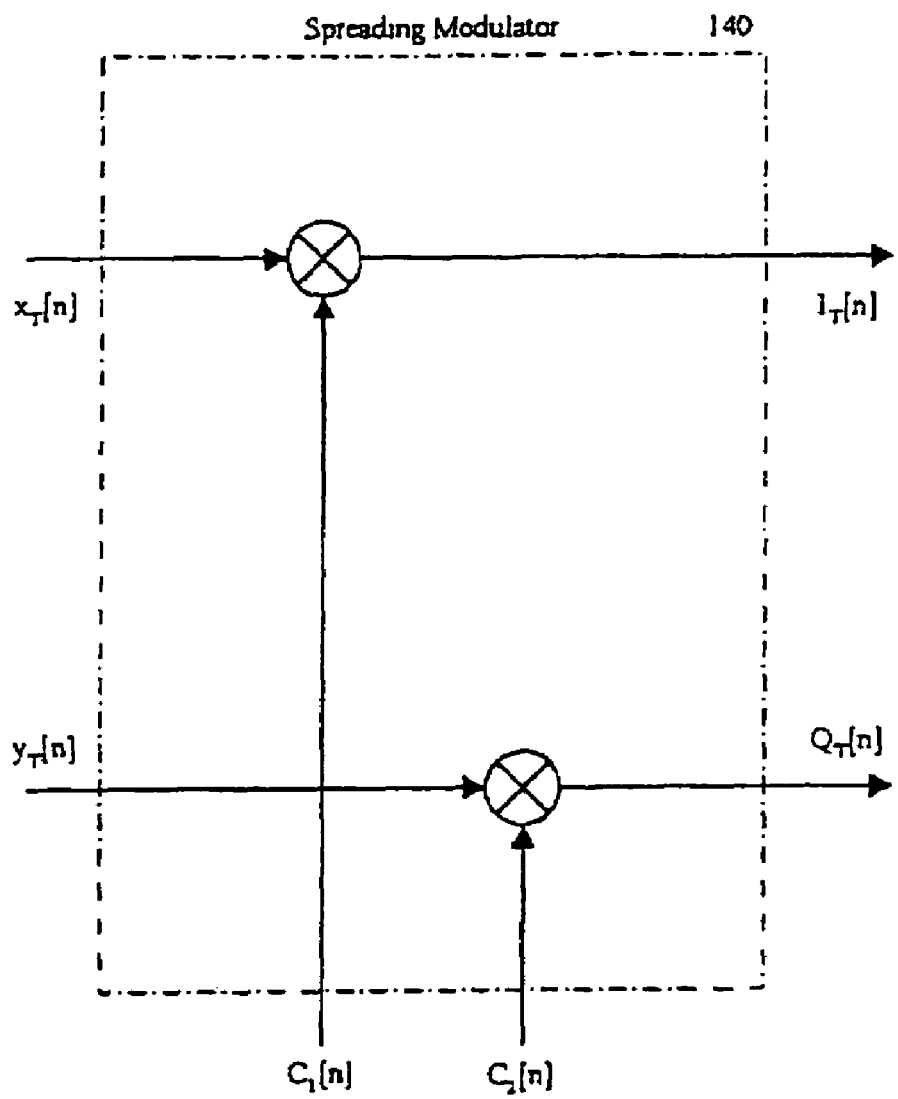
FIG. 3a shows a schematic diagram for a conventional QPSK spreading modulator.
Figure 3B:
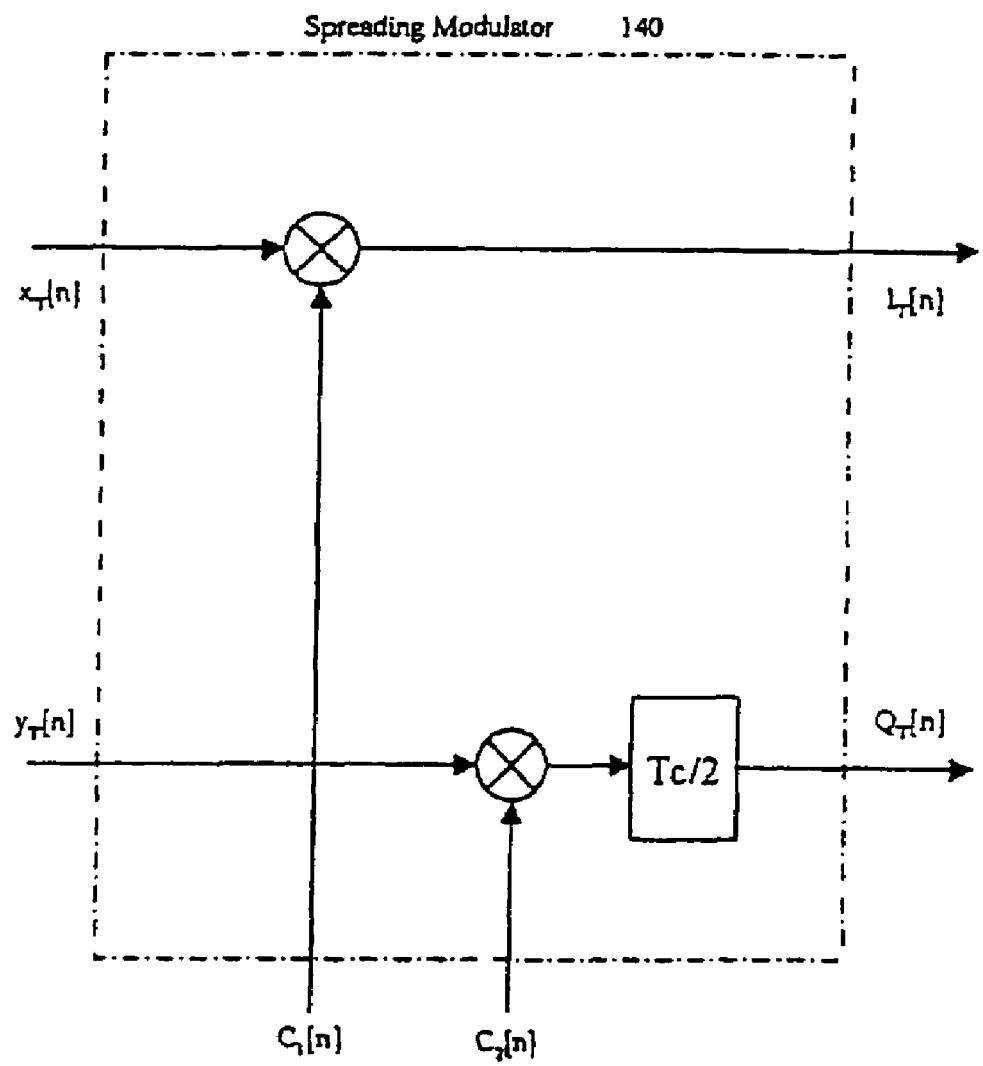
FIG. 3b shows a schematic diagram for a conventional OQPSK spreading modulator.
Figure 3C:
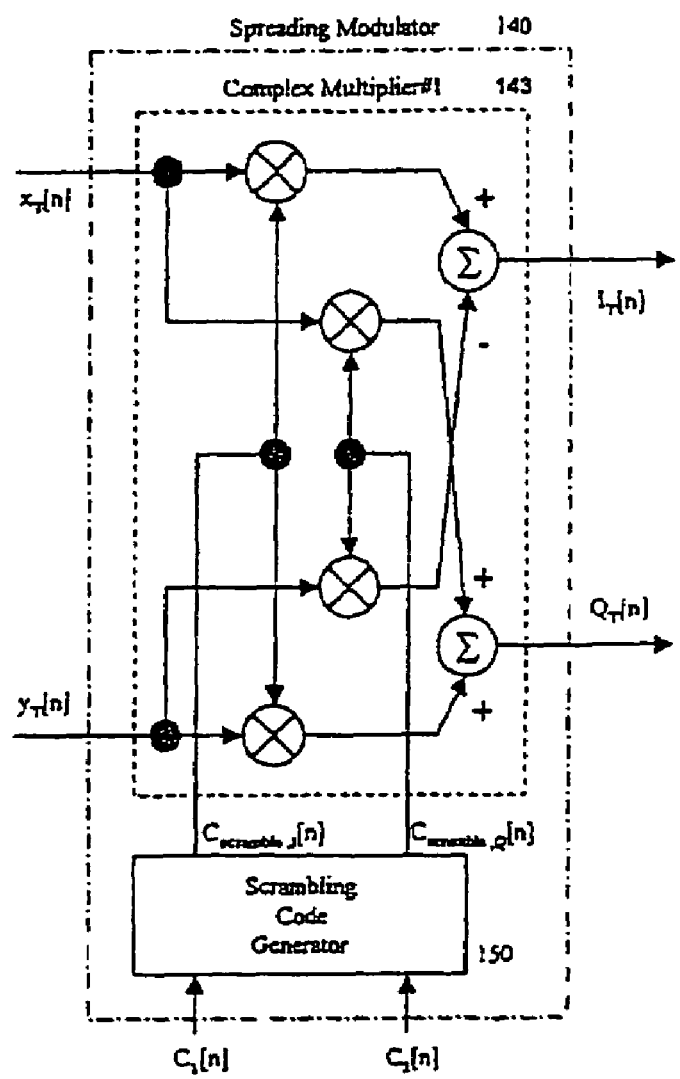
FIG. 3c shows a schematic diagram for a conventional CQPSK, OCQPSK, POCQPSK spreading modulator and for a spreading modulator according to the present invention.
Figure 3D:
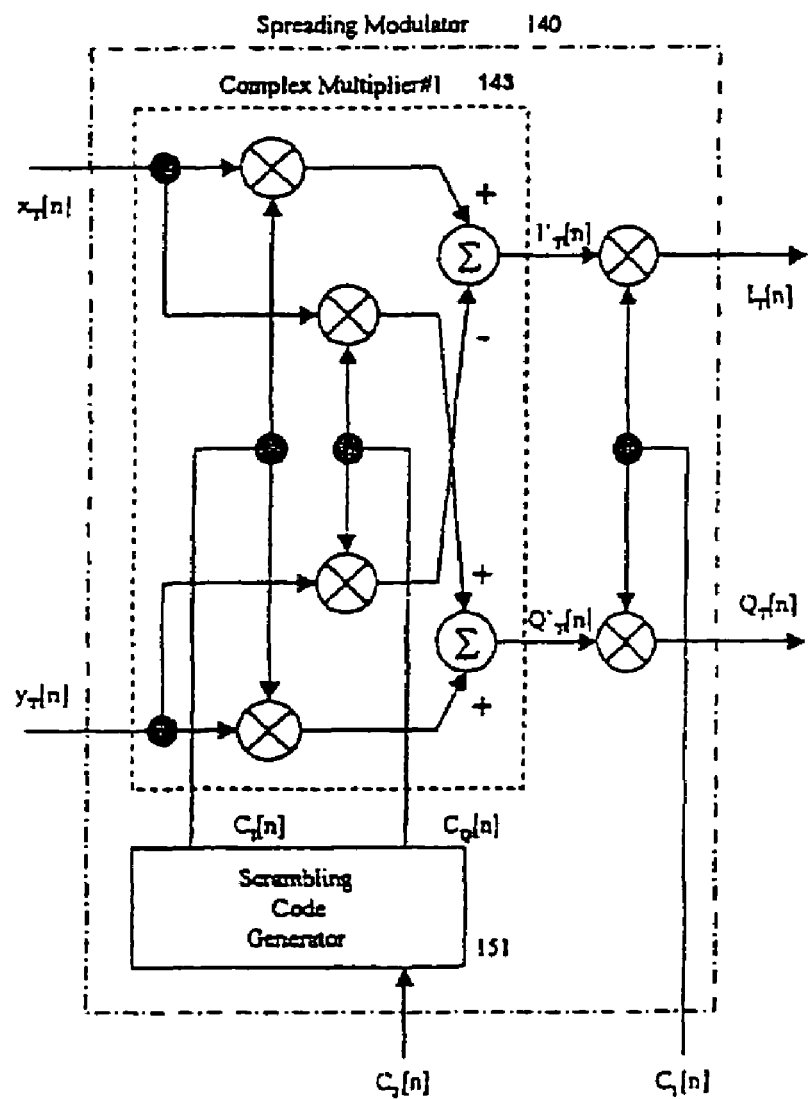
FIG. 3d shows another schematic diagram for a conventional OCQPSK, POCQPSK spreading modulator.
Figure 4A:
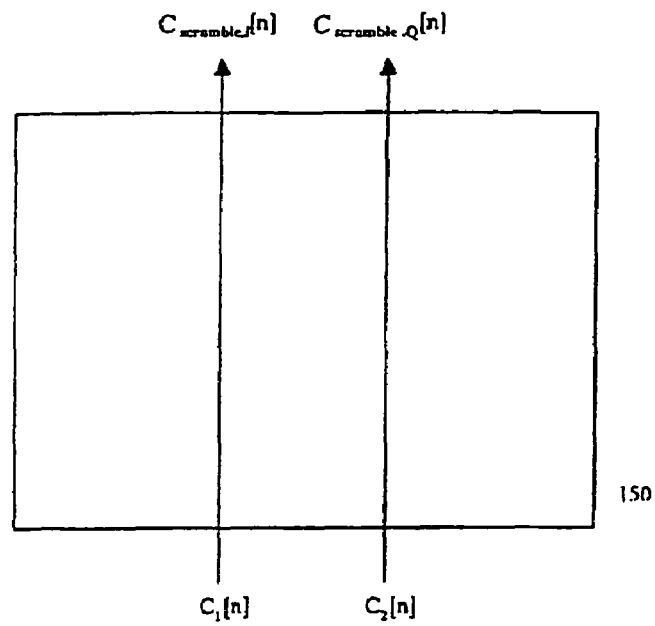
FIG. 4a shows a schematic diagram for the scrambling code generator in the QPSK, OQPSK, CQPSK spreading modulation.
Figure 4B:
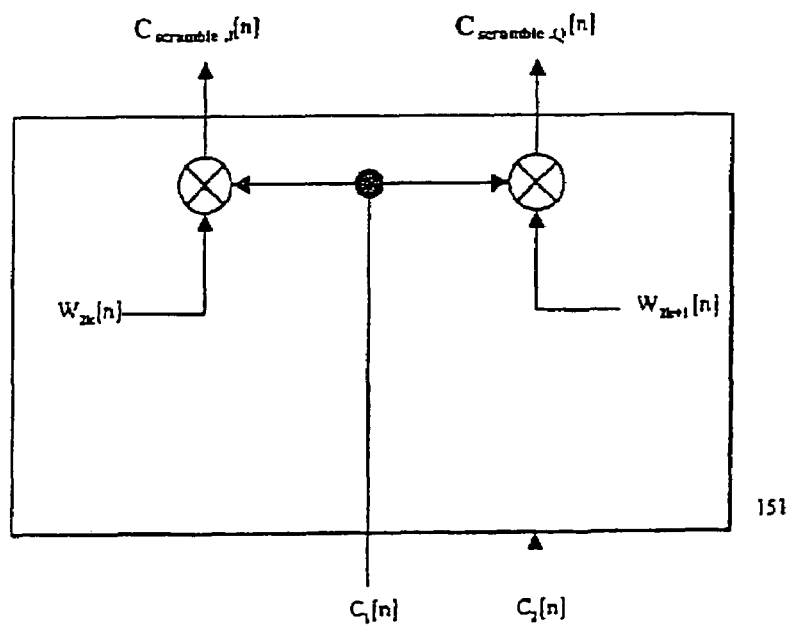
FIG. 4b shows a schematic diagram for the scrambling code generator in the OCQPSK spreading modulation.
Figure 4C:
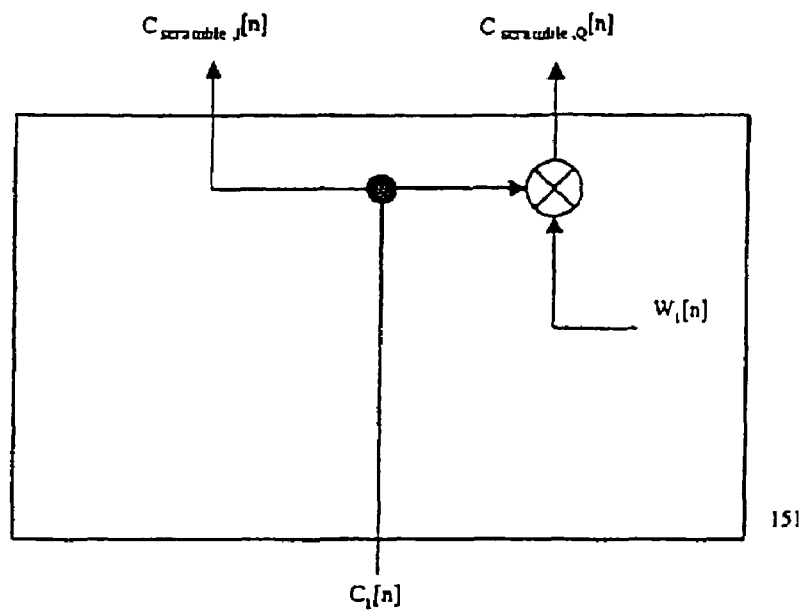
FIG. 4c shows another schematic diagram for the scrambling code generator in the OCQPSK spreading modulation.
Figure 4D:
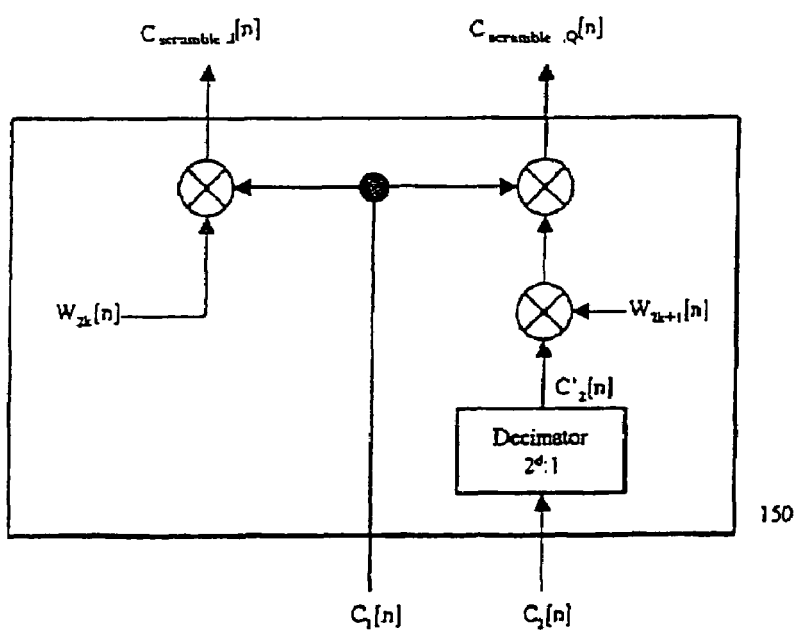
FIG. 4d shows a schematic diagram for the scrambling code generator in the POCQPSK spreading modulation.

<Explanations for main symbols in the drawings>
110, 112, 114, 116, 118: gain controller
120, 122, 124, 126, 128: spreader
130, 132: adder
140, 141: spreading modulator
143, 145: first (kind) complex(-domain) multiplier
150, 151: scrambling code generator
160, 162: low-pass filter (LPF)
170, 172: power amplifier
180, 182: modulator
190: adder
210, 212, 214, 215, 216, 217: integrator
220, 222, 224, 226, 225, 227: de-spreader
240, 241: spreading demodulator
242, 243, 245, 246: second (kind) complex(-domain) multiplier
260, 262: low-pass filter
280, 282: demodulator
510, 520, 530, 550: scrambling code generator
1220, 1222, 1224, 1226: de-spreader

BEST MODE FOR CARRYING OUT THE INVENTION

The present invention will be better understood with regard to the following description, appended claims, and accompanying figures. In this application, similar reference numbers are used for components similar to the prior art and the modified or added components in comparison with the prior art are described for the present invention in detail.

Figure 10:
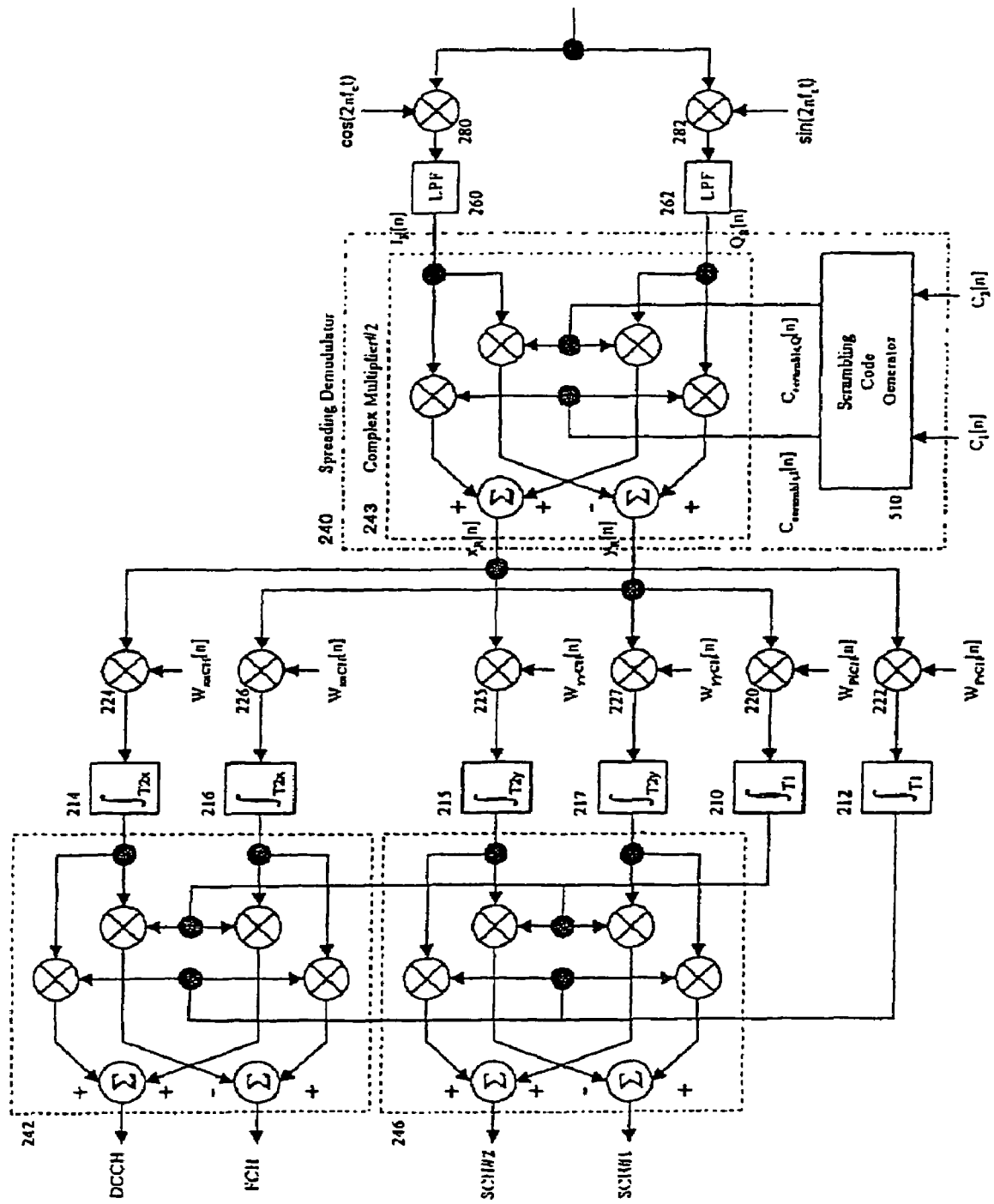
FIG. 10 shows a schematic diagram for a cdma2000 receiver according to the transmitter of FIG. 9.
Figure 11A:
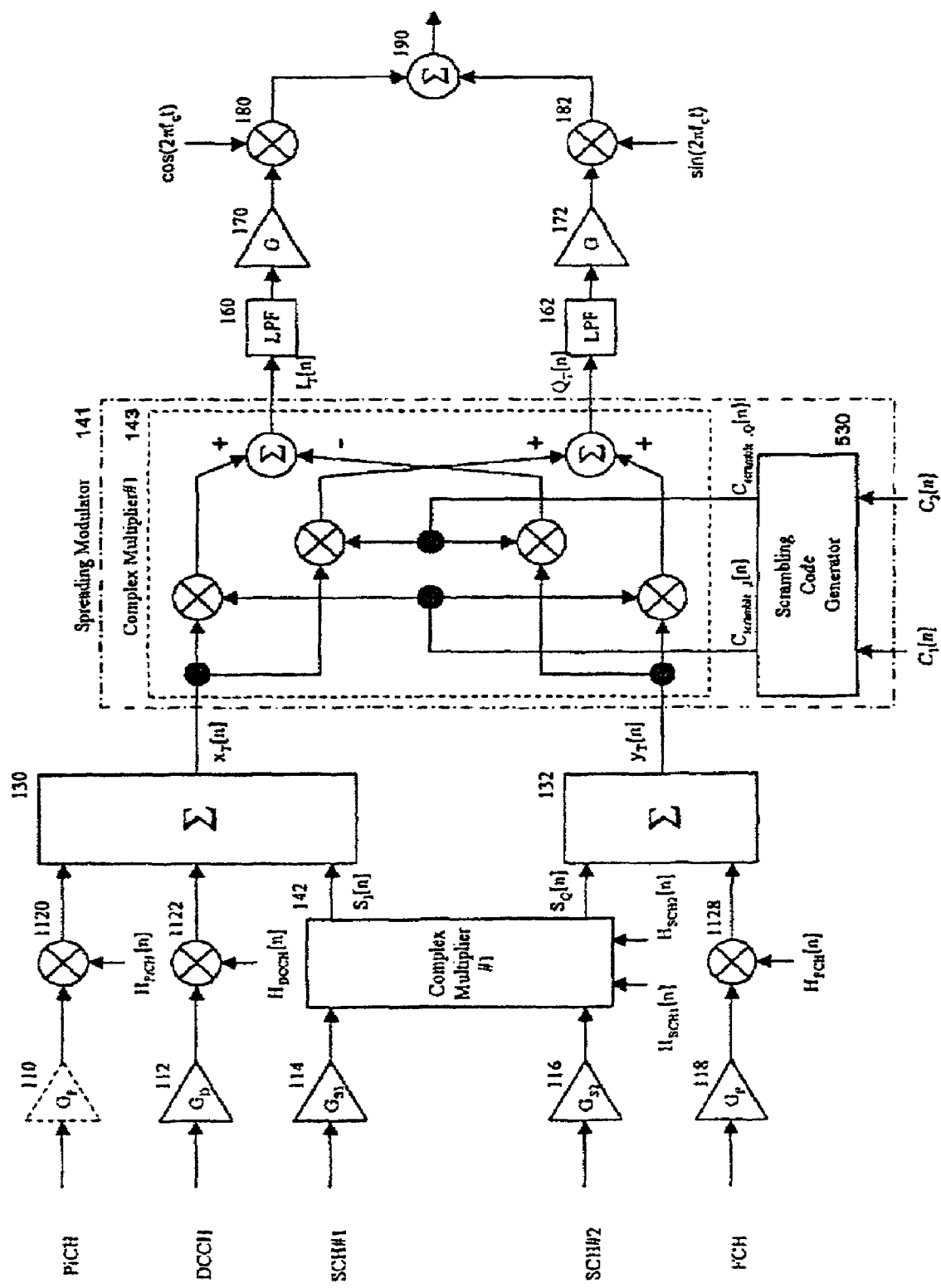
FIG. 11a shows a schematic diagram for a transmitter according to the present invention.
Figure 11B:
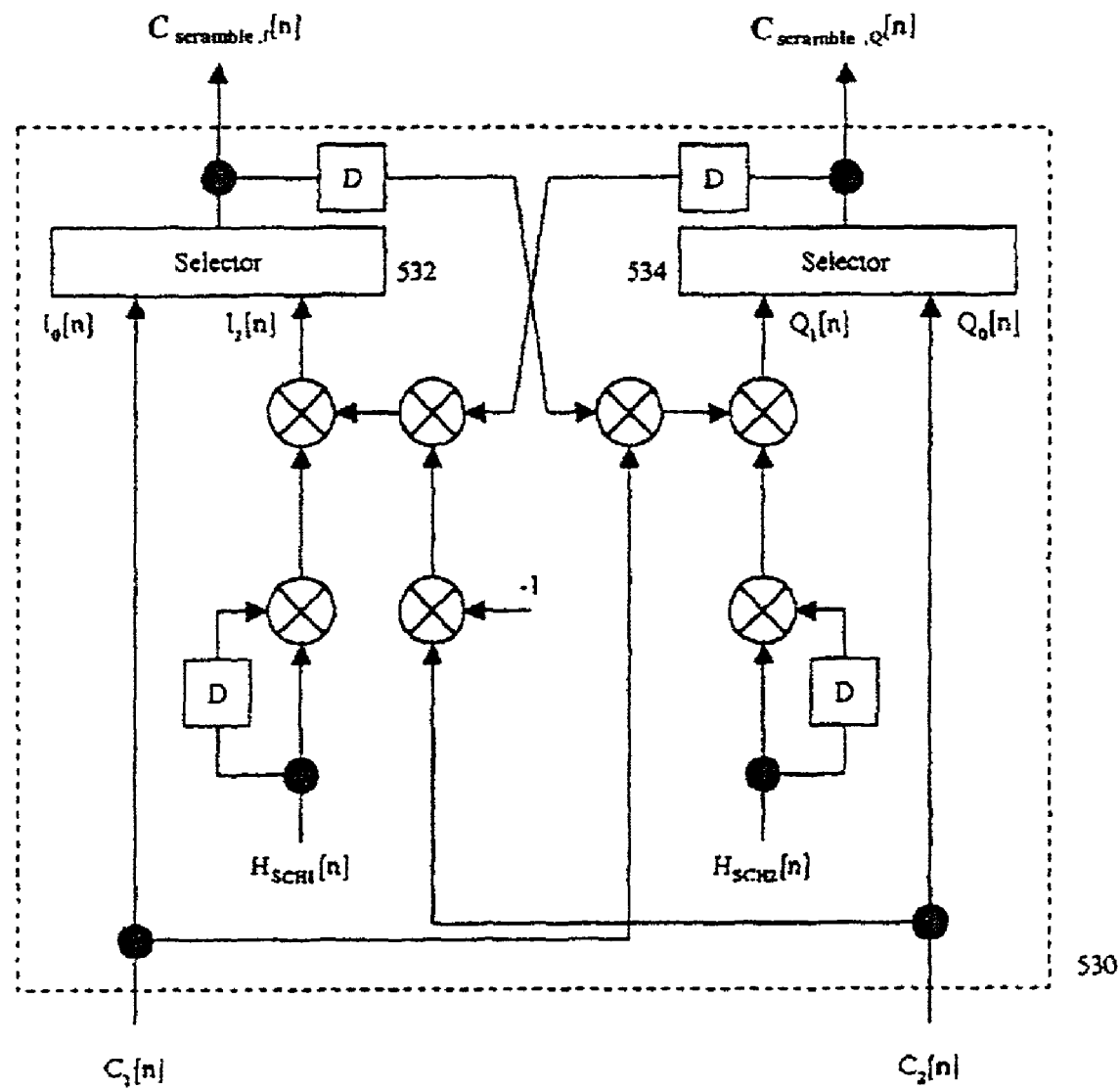
FIG. 11b shows a schematic diagram for the scrambling code generator in the DCQPSK spreading modulation according to the present invention.
Figure 12:
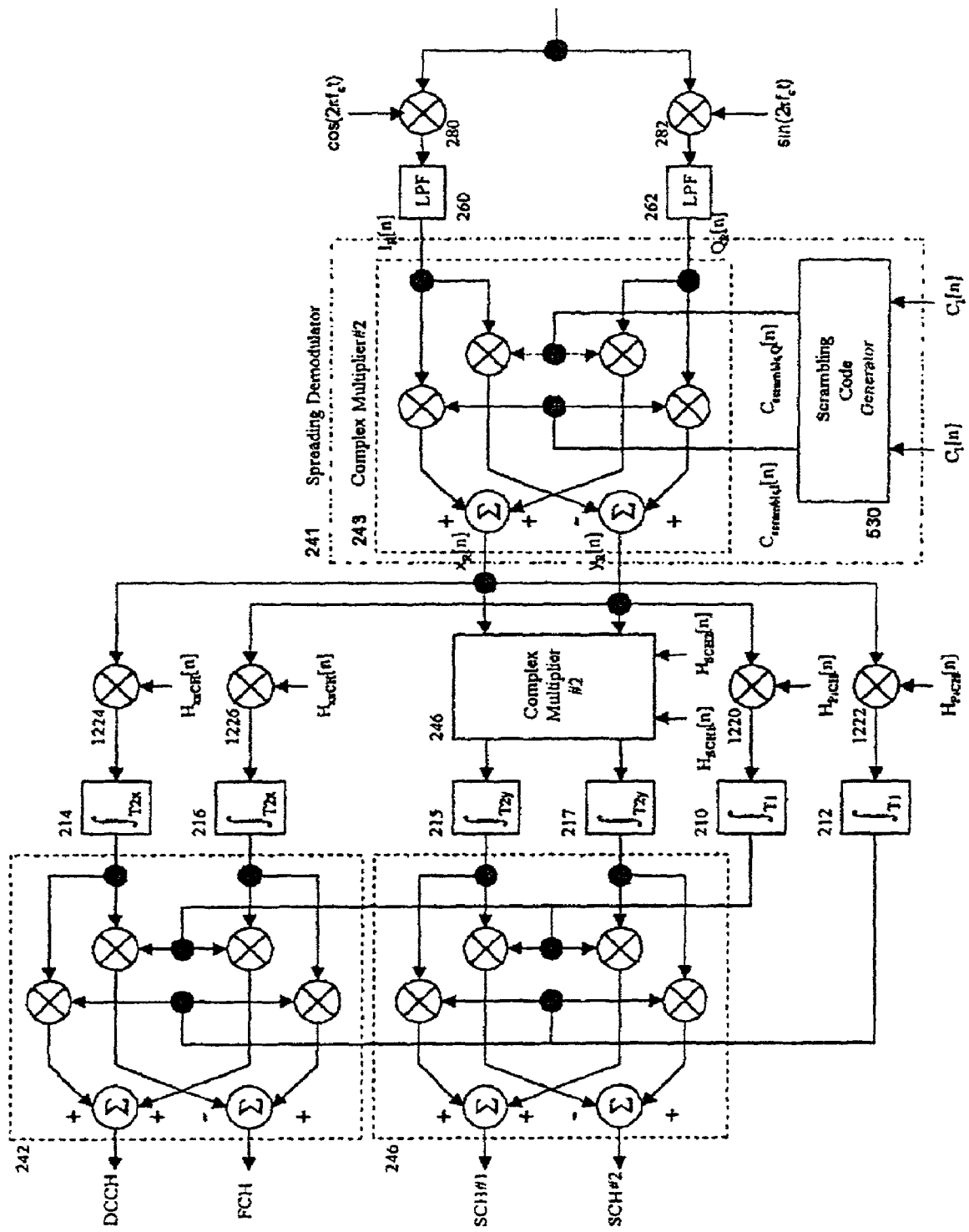

FIG. 11 and FIG. 12 show schematic diagram for a transmitter and a receiver according to the present invention, respectively. The transmitter in FIG. 11a and the receiver in FIG. 12 are modified from the transmitter and the receiver with the POCQPSK spreading modulator shown in FIG. 9 and FIG. 10. The transmitter according to the invention has 5 orthogonal channels: PiCH, DCCH, FCH, SCH1, and SCH2.

Figure 9:
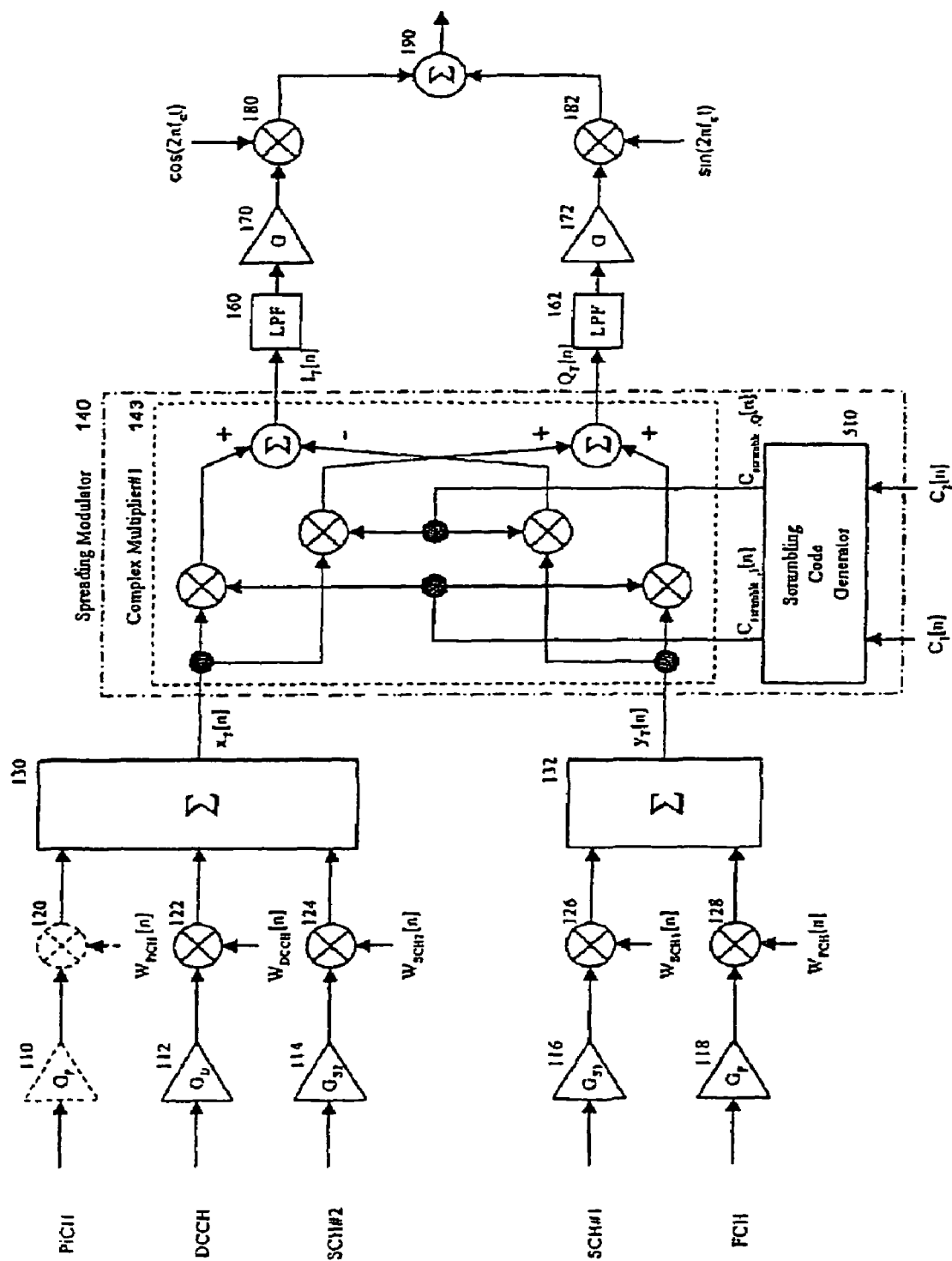
FIG. 9 shows a schematic diagram for a cdma2000 transmitter.

Unlike the previous transmitter as in FIG. 9, the transmitter according to the invention has an additional complex-domain multiplier (145) shown in the left of FIG. 11a. The complex-domain multiplier (145) takes the transmitting data $$\left(D_{SCH1}\left[\left\lfloor\frac{n}{SF_{SCH1}}\right\rfloor\right], D_{SCH2}\left[\left\lfloor\frac{n}{SF_{SCH2}}\right\rfloor\right]\right)$$

of SCH1 and SCH2 of statistically high transmitting power as the first inputs and takes the orthogonal OVSF codes ($H_{SCH1}[n]$, $H_{SCH2}[n]$) as the second inputs. And the first orthogonal complex-domain spreading occurs at the complex-domain multiplier (145). Other gain-controlled signals for PiCH, DCCH and FCH spread at the spreaders (1120, 1122, 1128) with orthogonal OVSF codes ($H_{PiCH}[n]$, $H_{DCCH}[n]$, $H_{FCH}[n]$), and are delivered to the adders (130, 132) with the outputs ($S_I[n]$, $S_Q[n]$) of the complex-domain multiplier (145). The outputs ($x_T[n]$, $y_T[n]$) of the adder (130, 132) are given in EQUATION 31.

$$x_T[n] = G_P H_{\Pi CH}[n] D_{\Pi CH}\left[\left\lfloor\frac{n}{SF_{\Pi CH}}\right\rfloor\right] +$$

$$G_D H_{DCCH}[n] D_{DCCH}\left[\left\lfloor\frac{n}{SF_{DCCH}}\right\rfloor\right] +$$

[EQUATION 31]

-continued $$\frac{1}{\sqrt{2}} G_{S1} H_{SCH1}[n] D_{SCH1}\left[\left\lfloor\frac{n}{SF_{SCH1}}\right\rfloor\right] -$$

$$\frac{1}{\sqrt{2}} G_{S2} H_{SCH2}[n] D_{SCH2}\left[\left\lfloor\frac{n}{SF_{SCH2}}\right\rfloor\right]$$

$$\simeq \frac{1}{\sqrt{2}} G_{S1} H_{SCH1}[n] D_{SCH1}\left[\left\lfloor\frac{n}{SF_{SCH1}}\right\rfloor\right] -$$

$$\frac{1}{\sqrt{2}} G_{S2} H_{SCH2}[n] D_{SCH2}\left[\left\lfloor\frac{2}{SF_{SCH2}}\right\rfloor\right]$$

$$y_T[n] = G_F H_{FCH}[n] D_{FCH}\left[\left\lfloor\frac{n}{SF_{FCH}}\right\rfloor\right] +$$

$$\frac{1}{\sqrt{2}} G_{S2} H_{SCH1}[n] D_{SCH2}\left[\left\lfloor\frac{n}{SF_{SCH2}}\right\rfloor\right] +$$

$$\frac{1}{\sqrt{2}} G_{S1} H_{SCH2}[n] D_{SCH1}\left[\left\lfloor\frac{n}{SF_{SCH1}}\right\rfloor\right]$$

$$\simeq \frac{1}{\sqrt{2}} G_{S2} H_{SCH1}[n] D_{SCH2}\left[\left\lfloor\frac{n}{SF_{SCH2}}\right\rfloor\right] +$$

$$\frac{1}{\sqrt{2}} G_{S1} H_{SCH2}[n] D_{SCH1}\left[\left\lfloor\frac{n}{SF_{SCH1}}\right\rfloor\right]$$

Figure 5A:
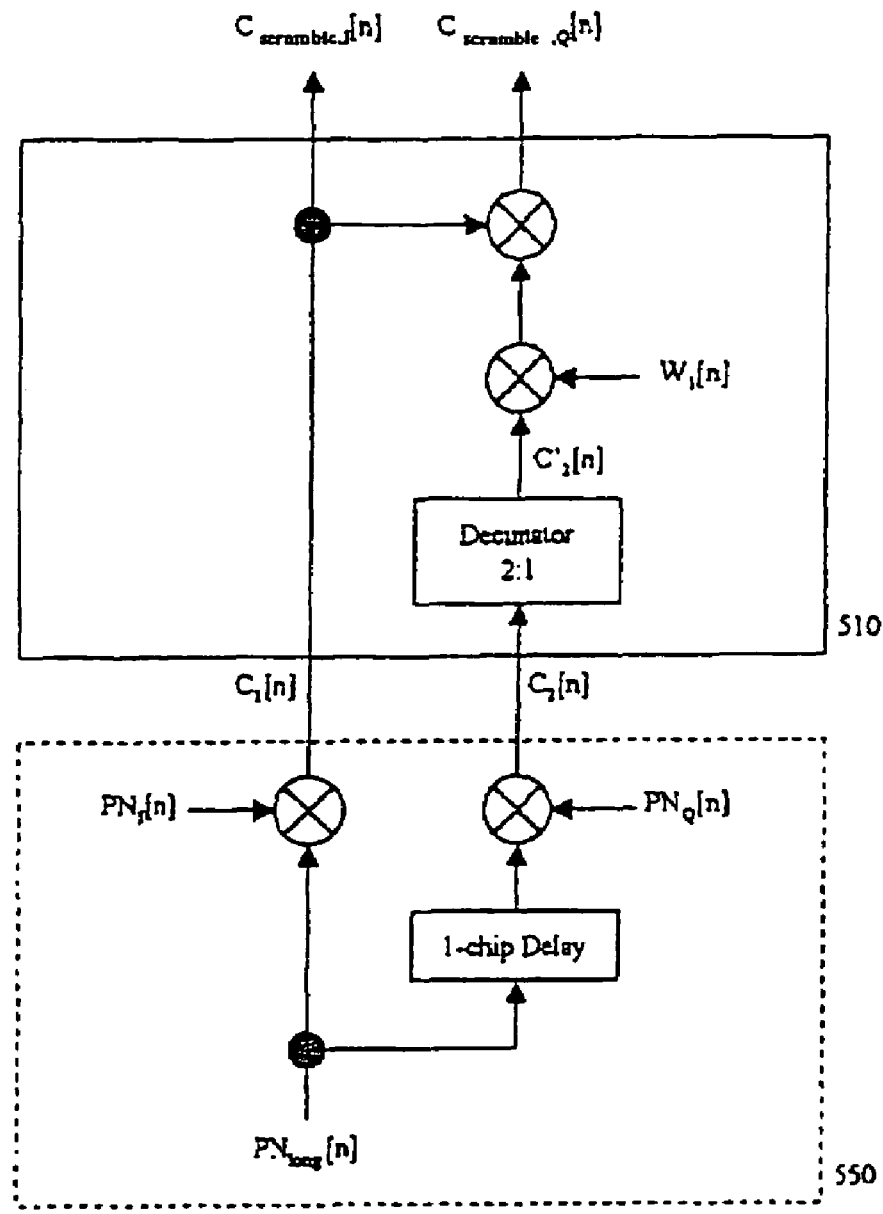
FIG. 5a shows schematic diagrams for the first and secondary scrambling code generators in the cdma2000 modulation.
Figure 5B:
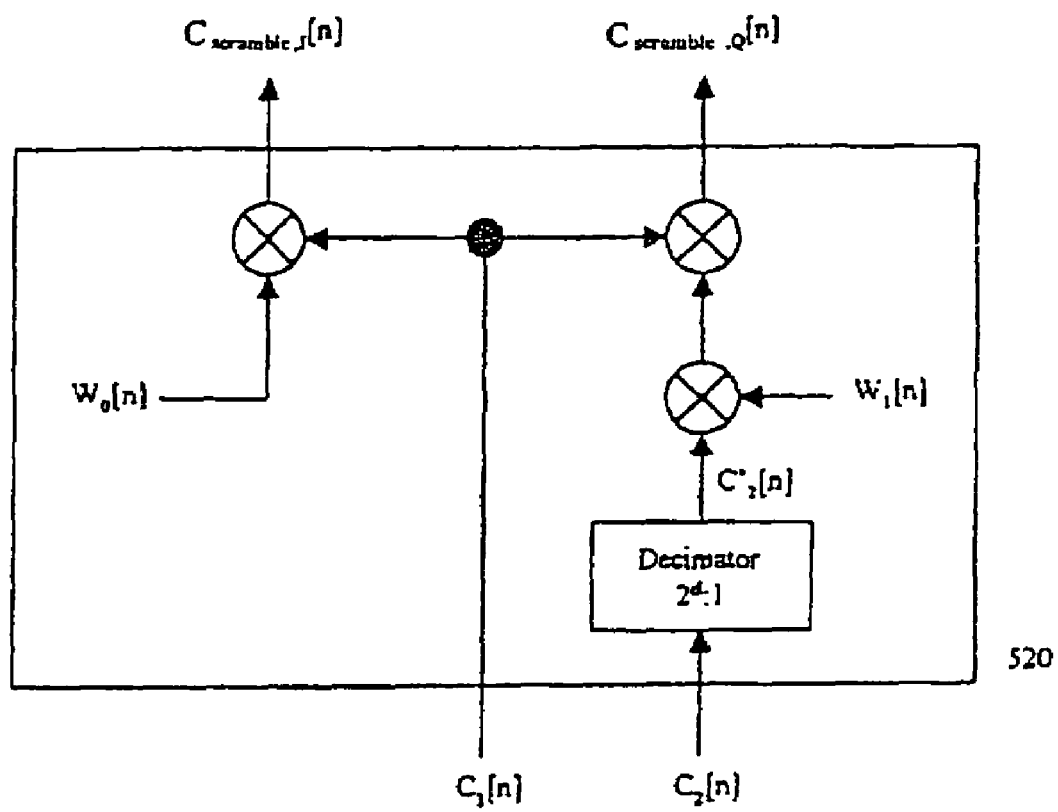
Figure 6A:
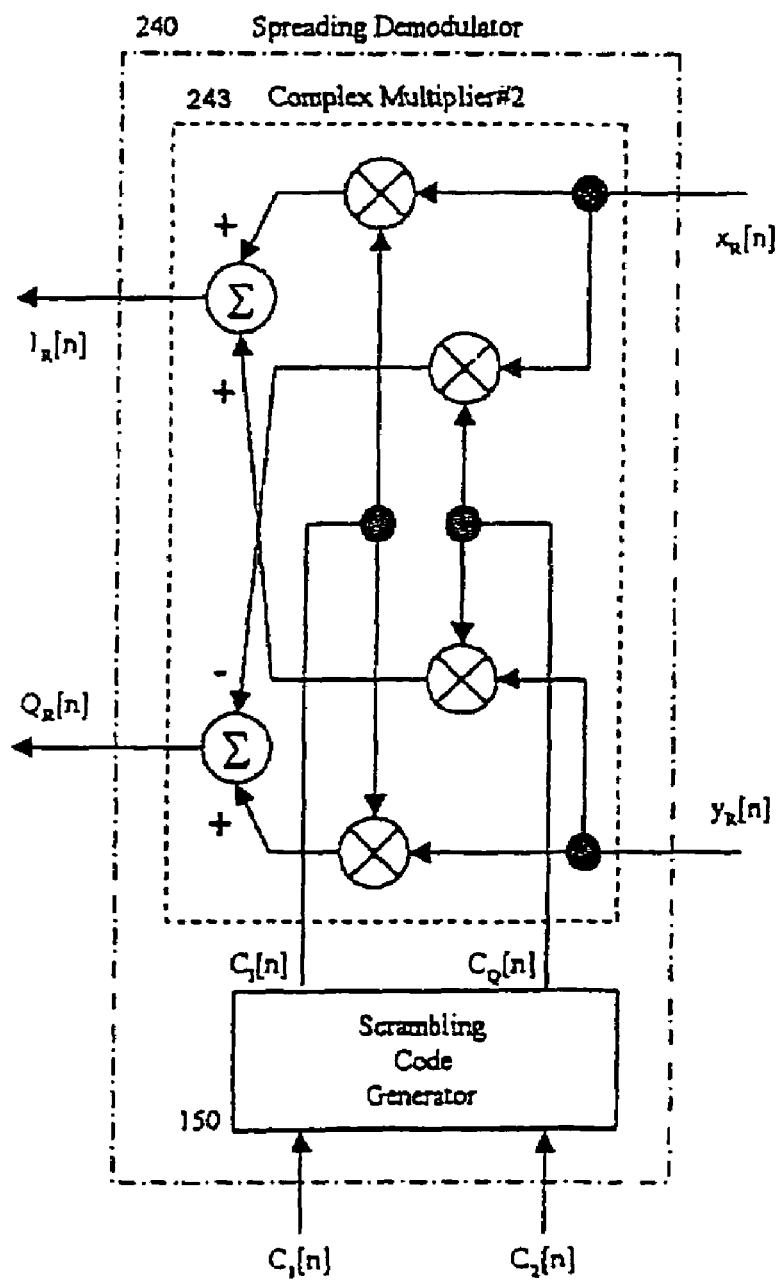
FIG. 6a shows a schematic diagram for a conventional CQPSK, OCQPSK, POCQPSK spreading demodulator and for a spreading demodulator according to the present invention.
Figure 6B:
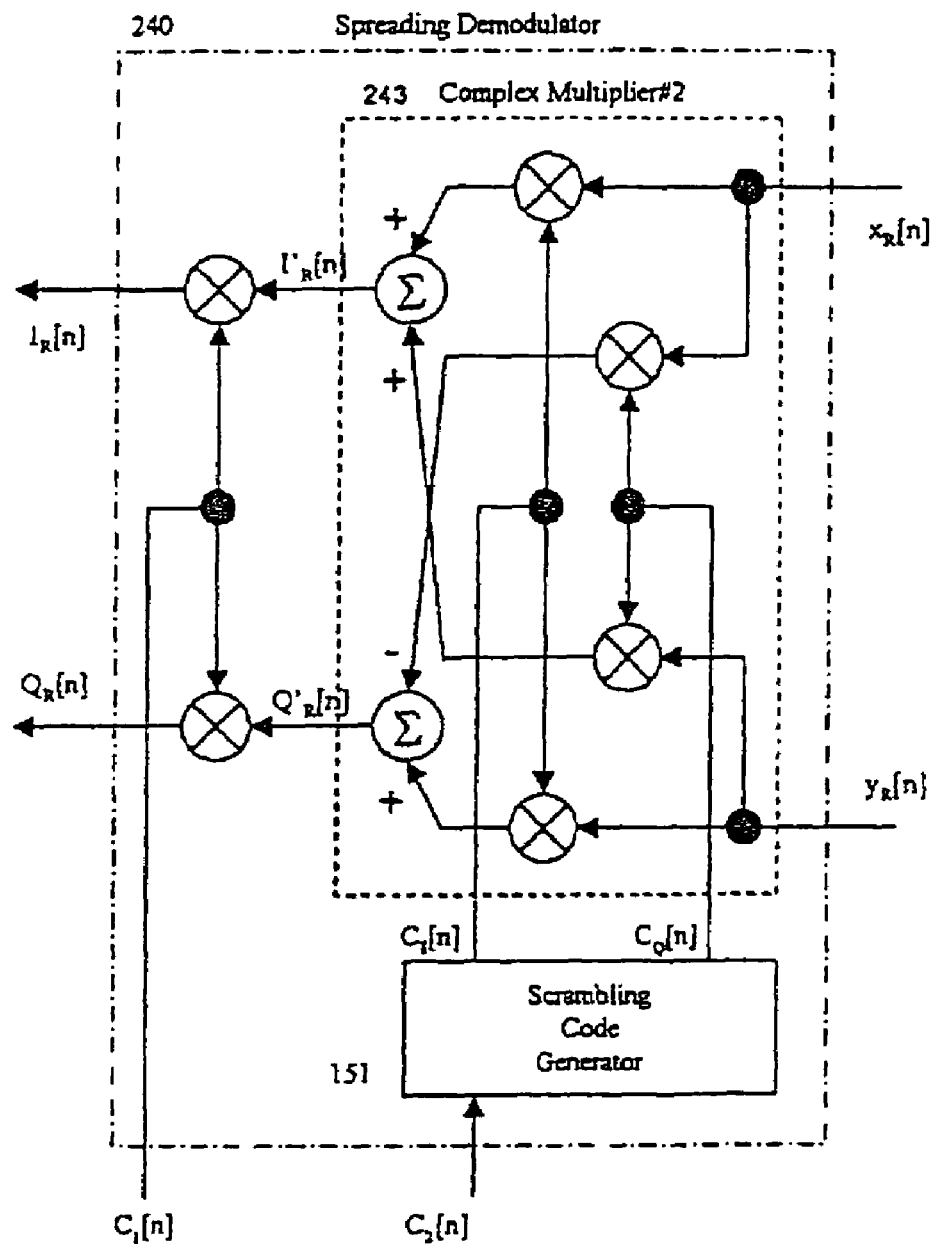
FIG. 6b shows a schematic diagram for a conventional OCQPSK, POCQPSK spreading demodulator.
Figure 7A:
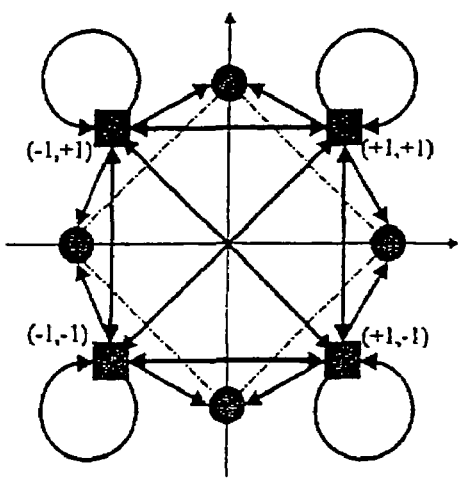
FIG. 7a shows a signal constellation diagram and transitions.
Figure 7B:
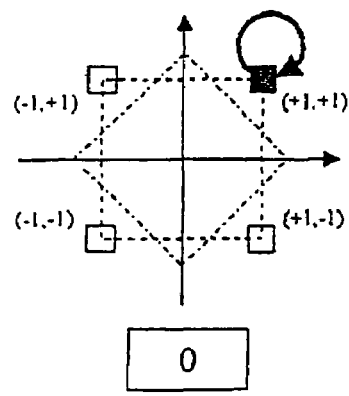
FIG. 7b shows four possible transitions of a signal constellation point.
Figure 7B:
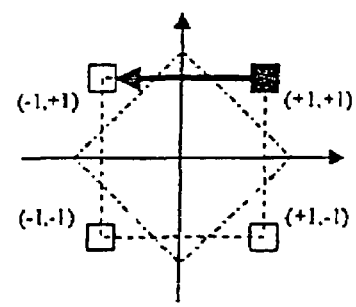
Figure 7B:
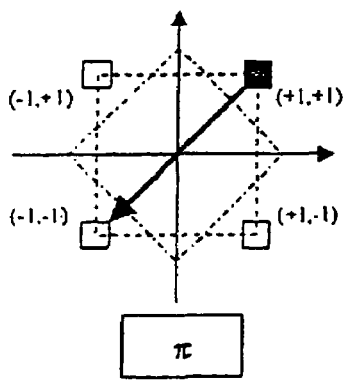
Figure 7B:
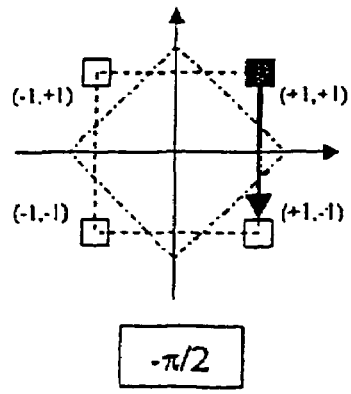
Figure 8A:
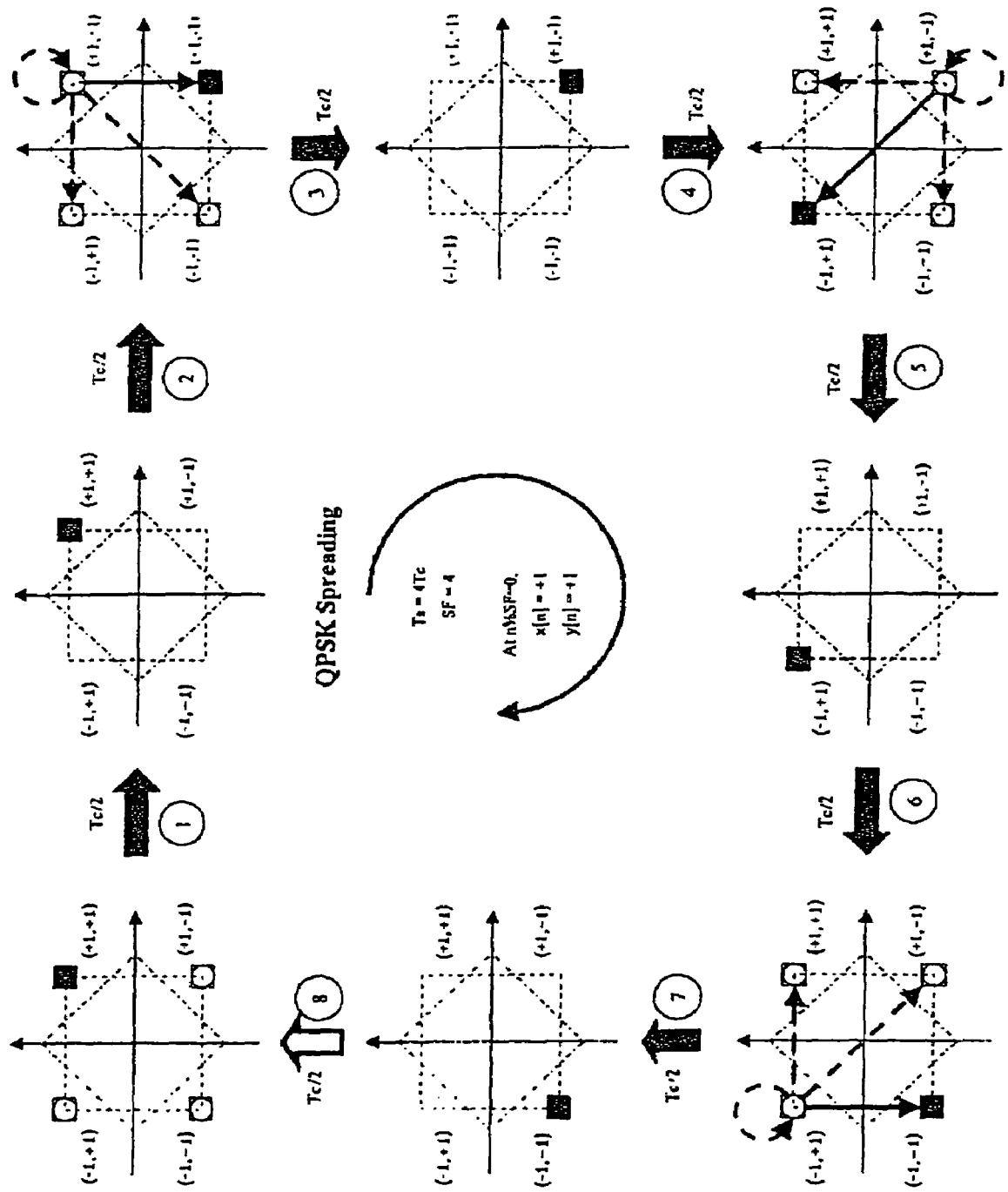
FIG. 8a shows the transition of a signal constellation point for the QPSK spreading modulation.
Figure 8B:
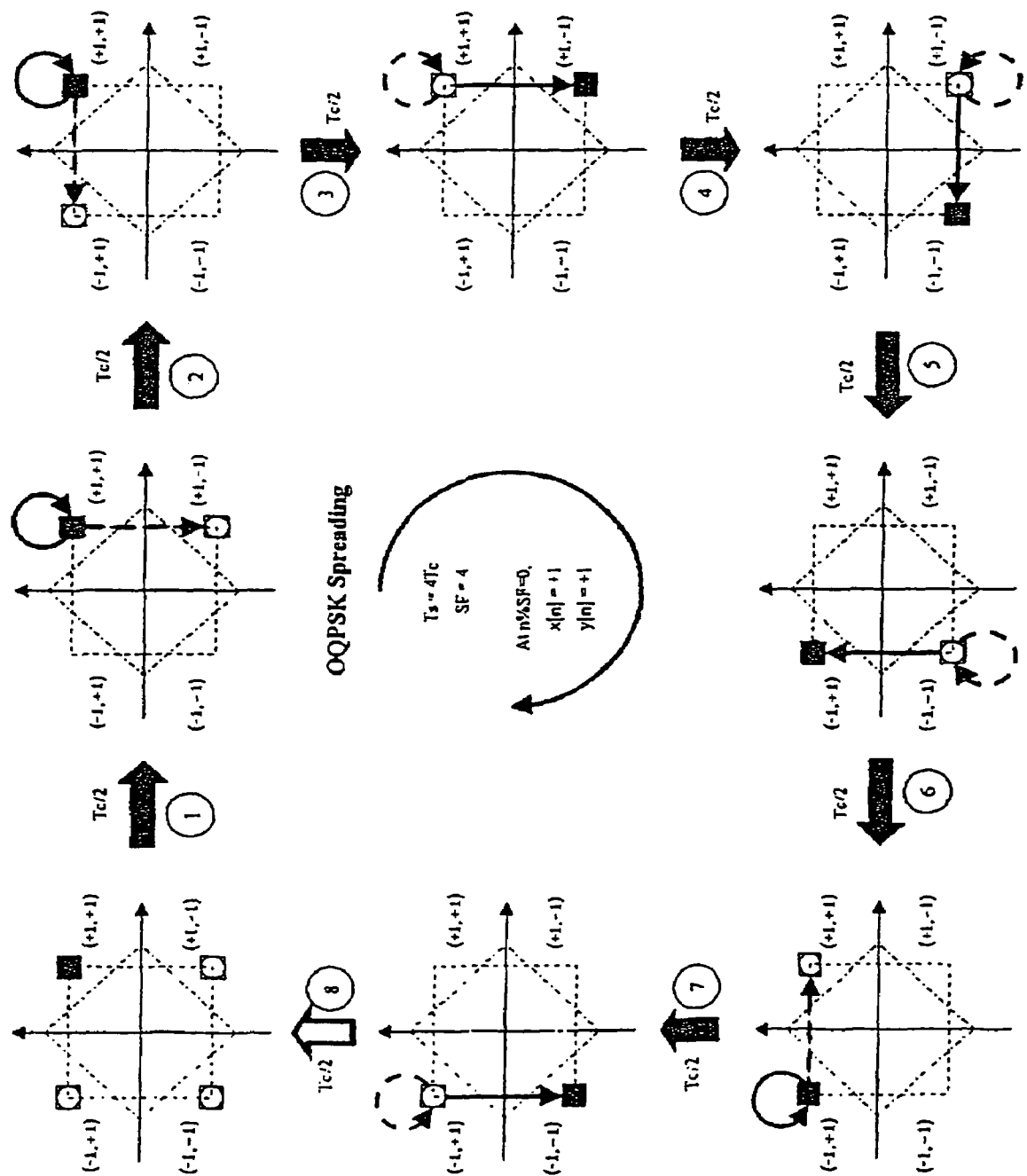
FIG. 8b shows the transitions of a signal constellation point for the OQPSK spreading modulation.
Figure 8C:
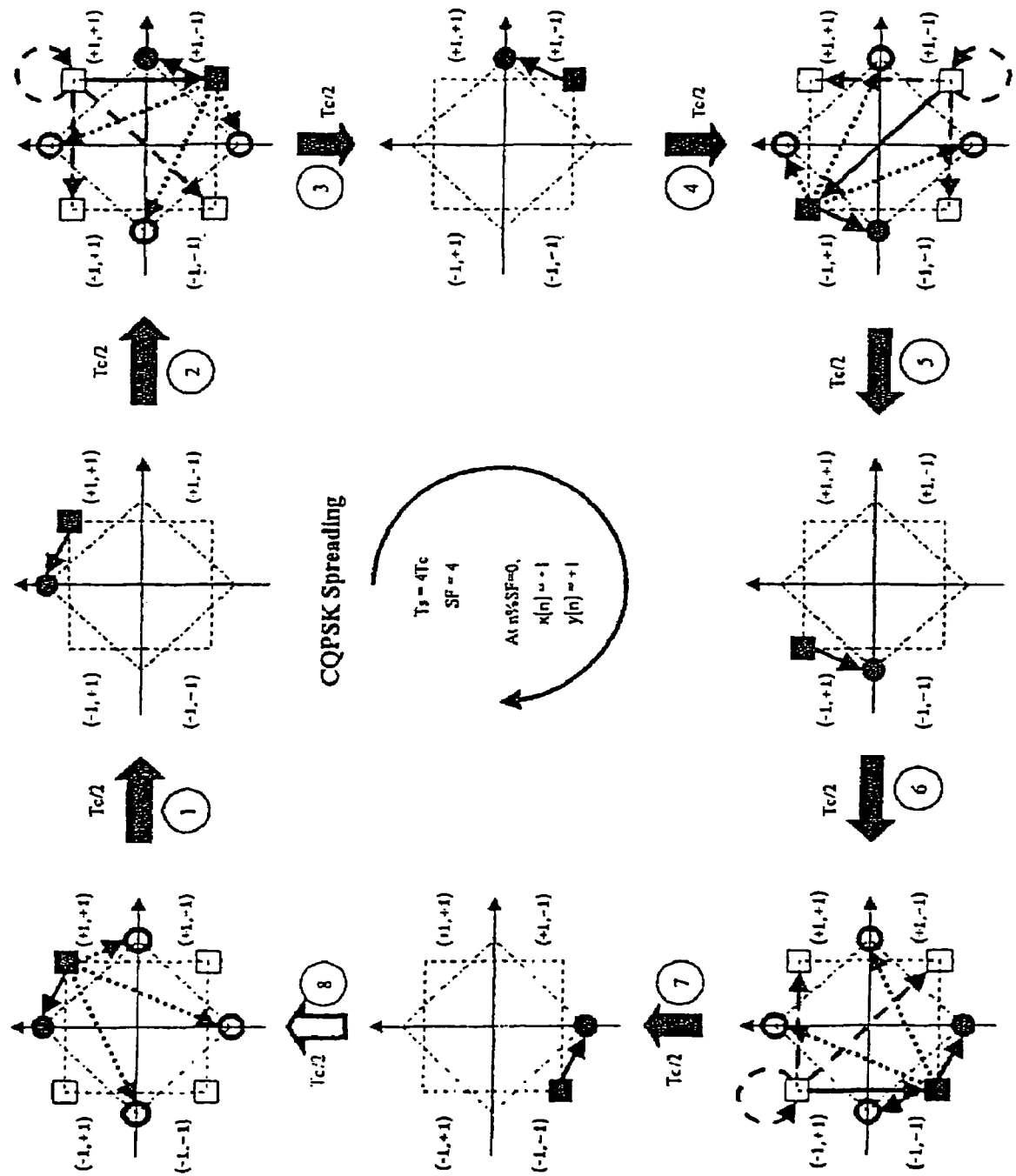
FIG. 8c shows the transitions of a signal constellation point for the CQPSK spreading modulation.

The spreading modulation takes place at the Spreading Modulator (141) with the first inputs ($x_T[n]$, $y_T[n]$) and the second inputs (the primary scrambling codes; $C_1[n]$ and $C_2[n]$), and the outputs ($I_T[n]$, $Q_T[n]$) are generated. The spreading modulator (141) comprises the scrambling code generator (530) and the complex-domain multiplier (143). The scrambling code generator (530) according to the present invention shown in FIG. 11b generates the secondary scrambling codes ($C_{scramble, I}[n]$, $C_{scramble, Q}[n]$) with the primary scrambling codes ($C_1[n]$, $C_2[n]$) as the inputs to improve the PAR characteristic. The complex-domain multiplier (143) takes the $x_T[n]$, $y_T[n]$ as inputs and the secondary scrambling codes ($C_{scramble, I}[n]$, $C_{scramble, Q}[n]$) as another inputs. The primary scrambling codes ($C_1[n]$, $C_2[n]$) in the cdma2000 system are generated by the primary scrambling code generator (550) using three PN sequences ($PN_I[n]$, $PN_Q[n]$, $PN_{long}[n]$) as shown in FIG. 5a with the following equation:

$$C_1[n] = PN_I[n] PN_{long}[n]$$ [EQUATION 32]

$$C_2[n] = PN_Q[n] PN_{long}[n-1]$$

The secondary scrambling codes ($C_{scramble, I}[n]$, $C_{scramble, Q}[n]$) shown in FIG. 11b are given by the following equations.

(1) For $n \equiv 0$ mod min{$SF_{PiCH}$, $SF_{DCCH}$, $SF_{SCH2}$, $SF_{SCH1}$, $SF_{FCH}$}

$$C_{scramble.I}[n] = C_1[n]$$ [EQUATION 33]

$$C_{scramble.Q}[n] = C_2[n]$$

$$\arg\left\{\frac{I_T[n] + jQ_T[n]}{I_T[n-1] + jQ_T[n-1]}\right\} \in \left\{0, +\frac{\pi}{2}, -\frac{\pi}{2}, \pi\right\}$$

(2) For $n \not\equiv 0$ mod min{$SF_{PiCH}$, $SF_{DCCH}$, $SF_{SCH2}$, $SF_{SCH1}$, $SF_{FCH}$}

$$C_{scramble,I}[n] + jC_{scramble,Q}[n] = jC_2[n]\{C_{scramble,I}[n-1] H_{SCH1}[n-1] H_{SCH1}[n] + jC_{scramble,Q}[n-1] H_{SCH2}[n-1] H_{SCH2}[n]\}$$ [EQUATION 34]

$$C_{scramble,I}[n] = -C_2[n]C_{scramble,Q}[n-1]H_{SCH2}[n-1]$$
$$H_{SCH2}[n]$$

$$C_{scramble,Q}[n] = -C_2[n]C_{scramble,I}[n-1]H_{SCH1}[n-1]$$
$$H_{SCH1}[n]$$

The spreading modulation according to the present invention is called the PCQPSK (Double Complex QPSK) spreading modulation. For $|I_T[n]|=|Q_T[n]|=1$ based on the normalization, the possible transitions of the signal constellation point occurring in the DCQPSK spreading modulation are shown in EQUATION 35 and EQUATION 36. The probabilities for $\{0, +\pi/2, -\pi/2, \pi\}$ transitions are 1/4, 1/4, 1/4, and 1/4 for $n \equiv 0 \bmod SF_{min}$, and 0, 1/2, 1/2, and 0 when $n \not\equiv 0 \bmod SF_{min}$ for each transition, respectively. Here, $SF_{min} = \min\{SF_{PiCH}, SF_{DCCH}, SF_{SCH2}, SF_{SCH1}, SF_{FCH}\}$.

(1) For $n \equiv 0 \bmod SF_{min}$ tions. Thus the orthogonal code is represented by "H" instead of "W" representing the orthogonal Walsh code. The spreading factor (SF) or size of the orthogonal code need not be the power of 2.

The outputs ($I_T[n]$, $Q_T[n]$) of the Spreading Modulator (141) pass through the low-pass filters (160, 162) and the amplifiers (170, 172). Then the amplified outputs are delivered to the modulators (180, 182) which modulate the signals into the desired frequency band using a carrier. And the modulated signals are added by the adder (190), and delivered to an antenna.

FIG. 12 shows a schematic diagram for a receiver according to the transmitter of FIG. 11*a*. The received signals through the antenna are demodulated at the demodulators (280, 282) with the same carrier used at the transmitter, and

[EQUATION 35]
$$\frac{I_T[n] + jQ_T[n]}{I_T[n-1] + jQ_T[n-1]} = \left( \frac{D_{SCH1}\left[\left\lfloor \frac{n}{SF_{min}} \right\rfloor\right] + jD_{SCH2}\left[\left\lfloor \frac{n}{SF_{min}} \right\rfloor\right]}{D_{SCH1}\left[\left\lfloor \frac{n-1}{SF_{min}} \right\rfloor\right] + jD_{SCH2}\left[\left\lfloor \frac{n-1}{SF_{min}} \right\rfloor\right]} \right).$$

$$\frac{H_{SCH1}[n] + jH_{SCH2}[n]}{H_{SCH1}[n-1] + jH_{SCH2}[n-1]} \frac{C_1[n] + jC_2[n]}{C_{scramble,I}[n-1] + jC_{scramble,Q}[n-1]} \quad arg\left\{ \frac{I_T[n] + jQ_T[n]}{I_T[n-1] + jQ_T[n-1]} \right\}$$

$$\in \left\{0, +\frac{\pi}{2}, -\frac{\pi}{2}, \pi\right\}$$

(2) For $n \not\equiv \bmod SF_{min}$ $I_R[n]$ and $Q_R[n]$ are generated after the signals pass through

[EQUATION 36]
$$\frac{I_T[n] + jQ_T[n]}{I_T[n-1] + jQ_T[n-1]} = jC_2[n-1]H_{SCH1}[n]H_{SCH2}[n]H_{SCH1}[n-1]H_{SCH2}[n-1]\frac{NUM[n-1]}{DEN[n-1]}$$

$$= jC_2[n-1]H_a[n]H_a[n-1]\frac{NUM[n-1]}{DEN[n-1]}$$

$$NUM[n-1] = (C_I[n-2]H_{SCH1}[n-2] - C_Q[n-2]H_2[n-2]) +$$
$$jH_a[n](C_I[n-2]H_{SCH1}[n-2] + C_Q[n-2]H_2[n-2])$$

$$= \begin{cases} (C_I[n-2]H_{SCH1}[n-2] - C_Q[n-2]H_2[n-2]) \\ jH_a[n](C_I[n-2]H_{SCH1}[n-2] + C_Q[n-2]H_2[n-2]) \end{cases}$$

$$DEN[n-1] = C_I[n-2]H_{SCH1}[n-2] - C_Q[n-2]H_2[n-2]) + jH_o[n-1](C_I[n-2]H_{SCH1}[n-2] + C_Q[n-2]H_2[n-2])$$

$$= \begin{cases} (C_I[n-2]H_{SCH1}[n-2] - C_Q[n-2]H_2[n-2]) \\ jH_o[n-1](C_I[n-2]H_{SCH1}[n-2] + C_Q[n-2]H_2[n-2]) \end{cases}$$

$$arg\left\{ \frac{I_T[n] + jQ_T[n]}{I_T[n-1] + jQ_T[n-1]} \right\} = C_2[n-1]H_a\{n\}H_a[n-1]\frac{\pi}{2} + arg\left\{ \frac{H_a[n]}{H_a[n-1]} \right\}$$

$$= \pm \frac{\pi}{2} + arg\left\{ \frac{H_a[n]}{H_a[n-1]} \right\}$$

$$\in \left\{ +\frac{\pi}{2}, -\frac{\pi}{2} \right\}$$

Where $H_\alpha[n] = H_{SCH1}[n]H_{SCH2}[n]$. With the bit-wise XOR (eXculisive OR) operation in EQUATION 6, $(\alpha)_2 = (SCH1)_2 \oplus (SCH2)_2$.

In the OCQPSK or POCQPSK spreading modulation, as mentioned earlier, the orthogonal Walsh codes with even number subscripts are used except for the inevitable cases such as the case with the high transmitting data rate for a certain channel of spreading factor (SF) of 2. However, the DCQPSK spreading modulation supports the variable spreading factor keeping the orthogonal channel property with any orthogonal codes as shown in the previous equathe low-pas filters (260, 262). Then, the spreading demodulator (241) produces the signals ($x_R[n]$, $y_R[n]$) with the primary scrambling codes ($C_1[n]$, $C_2[n]$). The spreading demodulator (241) comprises the scrambling code generator (530) and the complex-domain multiplier (243). The scrambling code generator (520) produces the secondary scrambling codes ($C_{scramble, I}[n]$, $C_{scramble, Q}[n]$) with the primary scrambling codes ($C_1[n]$, $C_2[n]$) as the inputs to improve the PAR characteristic. The complex-domain multiplier (243) takes $I_R[n]$ and $Q_R[n]$ as the first inputs and the secondary scrambling codes ($C_{scramble, I}[n]$, $C_{scramble, Q}[n]$) as the second inputs. The first and secondary scrambling codes are generated by the same method as in the transmitter.

In order to pick up the desired channels among the ourputs ($x_R[n]$, $y_R[n]$) of the spreading demodulator (241), the signals are multiplied by the same orthogonal code $H_{xxCH}[n]$ (where, xxCH=DCCH or FCH) used in the transmitter, at the de-spreaders (1224, 1226) or the signal are multiplied in complex-domain at the complex-domain multiplier (245) in FIG. 12 with the same orthogonal code $H_{xxCH}[n]$ (where, xxCH=SCH1 or SCH2) used in the transmitter. Now, the signals are integrated during the symbol period $T_{2x}$ or $T_{2y}$. Since the signals at the receiver are distorted, PiCH is used to correct the distorted signal phase. Accordingly, the signals ($x_R[n]$, $y_R[n]$) are multiplied by the corresponding orthogonal code $H_{PiCH}[n]$, and are integrated during the period of $T_1$ at the integrators (210, 212).

The reverse link PiCH in the cdma2000 system may include additional information such as a control command to control the transmitting power at the receiver, besides the pilot signals for the phase correction. In this case, the additional information is extracted by the de-multiplexer, and the phase is estimated using the part of the pilot signals having the known phase. The phase corrections are performed at the complex-domain multipliers (242, 246) using the estimated phase information through the integrators (210, 212).

The DCQPSK spreading modulation according to the present invention yields the following effects: First, the PAR characteristic is improved because the probability of the origin crossing transition ($\square$-transition) becomes zero only except for the time when the spread transmitting data vary. Second, the flexibility for the channel allocation becomes better because the DCQPSK can use all orthogonal codes while the OCQPSK or POCQPSK should use the orthogonal Walsh codes with even number subscripts.

While the foregoing invention has been described in terms of the embodiments discussed above, numerous variations are also possible. Accordingly, modifications and changes such as those suggested above, but not limited thereto, are considered to be within the scope of the following claims.

What is claimed is:

1. A transmitting method in CDMA (Code Division Multiple Access) systems with a transmitting apparatus and receiving apparatus, comprising the steps of:
   (a) generating a pilot signal and transmitting data signals for several channels with different information, said data signals including a pair of data signals and additional data signals; (b) supplying a pair of the data signals to a complex multiplier and spreading the pair of the data signals with complex orthogonal codes to obtain complex valued first spread signals, and spreading the additional data signals with complex orthogonal codes to obtain second spread signals; (c) adding the first complex valued spread and the second signals; (d) scrambling the added complex valued signals using complex valued PN (Pseudo-Noise) sequences; (e) modulating the scrambled signals with a carrier; and (f) transmitting a composite signal created by adding the modulated signals,
   wherein the complex spreading step and the complex scrambling step are arranged to improve the PAR (Peak-to-Average power Ratio) characteristic of the transmitter, and
   wherein the second complex-domain scrambling codes ($C_{scramble,I}[n]+jC_{scramble,Q}[n]$) in the scrambling step are given by the following equations in terms of the primary scrambling codes ($C_1[n]$, $C_2[n]$:

(a) when the spreading data vary,
   $C_{scramble,I}[n]+jC_{scramble,Q}[n]=C_1[n]+C_2[n]$; and
   (b) when the spreading data do not vary,
   $C_{scramble,I}[n]+jC_{scramble,Q}[n]=-C_2[n]C_{scramble,Q}[n-1]H_b[n-1]H_b[n]+jC_2[n]$
   $C_{scramble,I}[n-1]H_1[n-1]H_a[n]$.

2. A transmitting method in CDMA (Code Division Multiple Access) systems with a transmitting apparatus and receiving apparatus, comprising the steps of:
   (a) generating a pilot signal and transmitting data signals for several channels with different information, said data signals including a pair of data signals and additional data signals; (b) supplying a pair of the data signals to a complex multiplier and spreading the pair of the data signals with complex orthogonal codes to obtain complex valued first spread signals, and spreading the additional data signals with complex orthogonal codes to obtain second spread signals; (c) adding the first complex valued spread and the second signals; (d) scrambling the added complex valued signals using complex valued PN (Pseudo-Noise) sequences; (e) modulating the scrambled signals with a carrier; and (f) transmitting a composite signal created by adding the modulated signals,
   wherein the complex spreading step and the complex scrambling step are arranged to improve the PAR (Peak-to-Average power Ratio) characteristic of the transmitter, and
   wherein the orthogonal complex-domain spreading is performed with Hadamard codes and the scrambling codes for the complex-domain scrambling are produced using orthogonal Hadamard codes.

3. A transmitting method in CDMA (Code Division Multiple Access) systems with a transmitting apparatus and receiving apparatus, comprising the steps of:
   (a) generating a pilot signal and transmitting data signals for several channels with different information, said data signals including a pair of data signals and additional data signals; (b) supplying a pair of the data signals to a complex multiplier and spreading the pair of the data signals with complex orthogonal codes to obtain complex valued first spread signals, and spreading the additional data signals with complex orthogonal codes to obtain second spread signals; (c) adding the first complex valued spread and the second signals; (d) scrambling the added complex valued signals using complex valued PN (Pseudo-Noise) sequences; (e) modulating the scrambled signals with a carrier; and (f) transmitting a composite signal created by adding the modulated signals,
   wherein the complex spreading step and the complex scrambling step are arranged to improve the PAR (Peak-to-Average power Ratio) characteristic of the transmitter, and
   the orthogonal complex-domain spreading is performed with Walsh codes and the scrambling codes for the complex-domain scrambling are produced using orthogonal Hadamard codes.

4. A transmitting method in CDMA (Code Division Multiple Access) systems with a transmitting apparatus and receiving apparatus, comprising the steps of:
   (a) generating a pilot signal and transmitting data signals for several channels with different information, said data signals including a pair of data signals and additional data signals; (b) supplying a pair of the data signals to a complex multiplier and spreading the pair of the data signals with complex orthogonal codes to obtain complex valued first spread signals, and spreading the additional data signals with complex orthogonal codes to obtain second spread signals; (c)) adding the first complex valued spread and the second signals; (d) scrambling the added complex valued signals using complex valued PN (Pseudo-Noise) sequences; (e) modulating the scrambled signals with a carrier; and (f) transmitting a composite signal created by adding the modulated signals, wherein the complex spreading step and the complex scrambling step are arranged to improve the PAR (Peak-to-Average power Ratio) characteristic of the transmitter, and the orthogonal complex-domain spreading is performed with Gold codes and the scrambling codes for the complex-domain scrambling are produced using orthogonal Hadamard codes.

5. A transmitting apparatus in CDMA (Code Division Multiple Access) systems with a transmitting apparatus and receiving apparatus, comprising:

(a) means for generating a pilot signal and transmitting data signals for several channels with different information; (b) means for controlling the signal-gains of the channels (c) means for spreading the gain-controlled signal for each channel; (d) a first complex-domain multiplying means for performing a first orthogonal complex-domain spreading with the input of the transmitting data of the supplementary channels and of the OVSF (Orthogonal Variable Spreading Factor) codes; (e) means for adding the output of the first complex-domain multiplying means and the spread signal; (f) a spreading modulator, comprising a complex-domain multiplier and a scrambling code generator, for modulating the added signal; (g) means for amplifying low-pass filtered signal power; (h) means for modulating the amplified signal to the desired frequency band; and (i) means for adding the modulated signal.

6. A receiving apparatus in CDMA (Code Division Multiple Access) systems with a transmitting apparatus and receiving apparatus, comprising:

(a) means for demodulating the transmitted signal from an antenna using the same carrier used in the transmitter; (b) a spreading de-modulator, comprising a scrambling code generator and complex-domain multiplying means, for de-scrambling the modulated signal; (c) means for de-spreading the de-scrambled signal to get the desired channel by integrating for the symbol period proportional to the data rate of the corresponding channel; and (d) second complex-domain multiplying means for correcting the phase of the de-spread signal.

7. A receiving apparatus as defined in claim 6, wherein the carrier used in the demodulating means of step (a) in claim 6 include the same waves used in the transmitter.

* * * * *